United States Patent [19]
Jowers et al.

[11] 4,126,779
[45] Nov. 21, 1978

[54] REMITTANCE PROCESSOR

[75] Inventors: Leonard J. Jowers, Adamsville;
James C. Kennemer, Birmingham;
William J. Long, Birmingham;
Charles A. Long, Jr., Birmingham;
Robert L. Babanats, Adamsville, all
of Ala.

[73] Assignee: Amer-o-Matic Corporation,
Bessemer, Ala.

[21] Appl. No.: 693,237

[22] Filed: Jun. 4, 1976

[51] Int. Cl.² .................... G06K 1/14; G06F 15/12
[52] U.S. Cl. ................................ 235/432; 235/376;
235/378
[58] Field of Search ............... 235/61.6 R, 61.6 J,
235/61.9 R, 61.9 A, 61.7 B, 61.1 E, 61.7 R;
364/900, 200

[56] References Cited
U.S. PATENT DOCUMENTS

| | | | |
|---|---|---|---|
| 3,104,314 | 9/1963 | Simjian | 235/61.9 R |
| 3,624,357 | 11/1971 | Wright | 235/61.7 B |
| 3,801,774 | 4/1974 | Michaelis | 235/61.6 R |
| 3,859,509 | 1/1975 | Dillingham | 235/61.9 R |
| 3,878,365 | 4/1975 | Schwartz | 235/61.9 R |
| 3,959,624 | 5/1976 | Kaslow | 235/61.11 E |
| 3,979,730 | 9/1976 | Bennett | 445/1 |

Primary Examiner—Robert M. Kilgore
Attorney, Agent, or Firm—Seidel, Gonda & Goldhammer

[57] ABSTRACT

Apparatus for processing batchs of remittance and transaction documents by operating an encoder in accordance with a program stored in memory. A central processor unit sequentially generates a plurality of groups of data signals in accordance with the program. A card or document reader reads information stored on a transaction document and transmits the information through a card reader interface to the central processor unit. A switch control interface senses the states of a plurality of switches indicative of control and endorsement information and transmits the information to the central processor unit. A display interface causes a display to display numeric and control information stored on the transaction document in response to one of the groups of central processor unit data signals. An encoder interface causes the encoder to encode a remittance document with the transaction document information and to endorse the remittance document with the endorsement information in response to another group of central processor unit data signals. The encoder interface also accepts control and numeric information from the encoder and transmits this information to the central processor unit.

13 Claims, 8 Drawing Figures

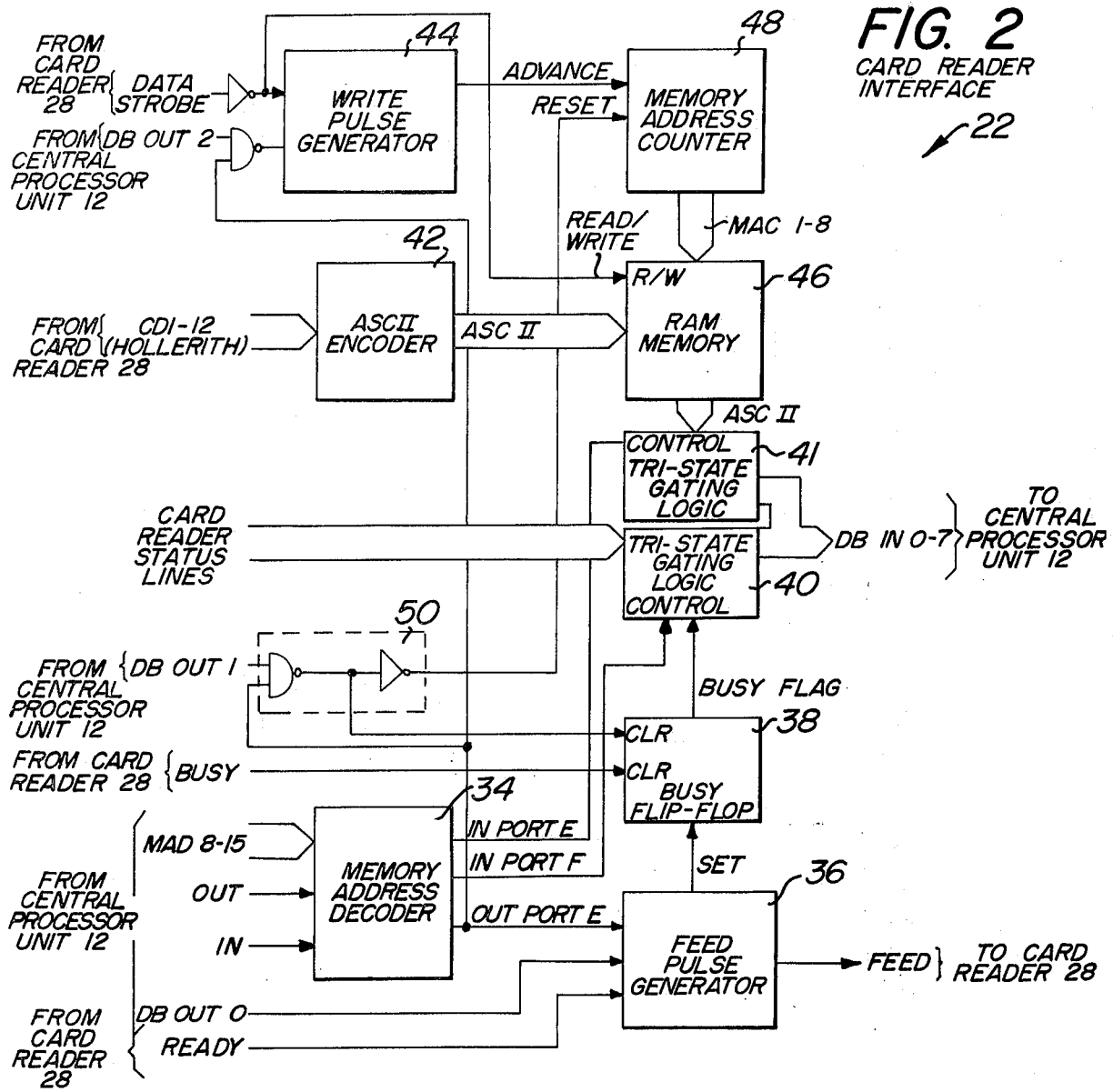
FIG. 2 CARD READER INTERFACE
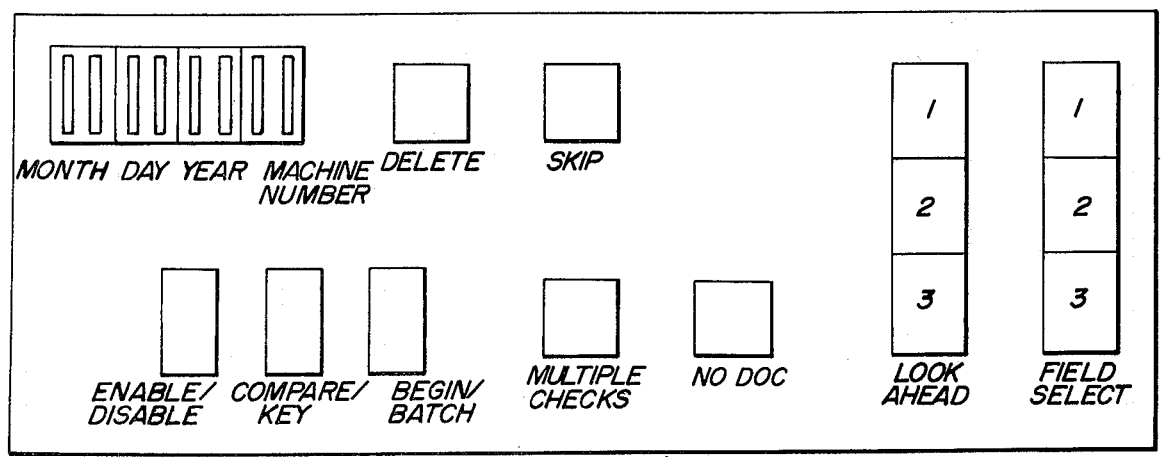
FIG. 7 SWITCH PANEL

ENCODER INTERFACE

SWITCH CONTROL INTERFACE

SERIAL I/O COMMUNICATIONS INTERFACE

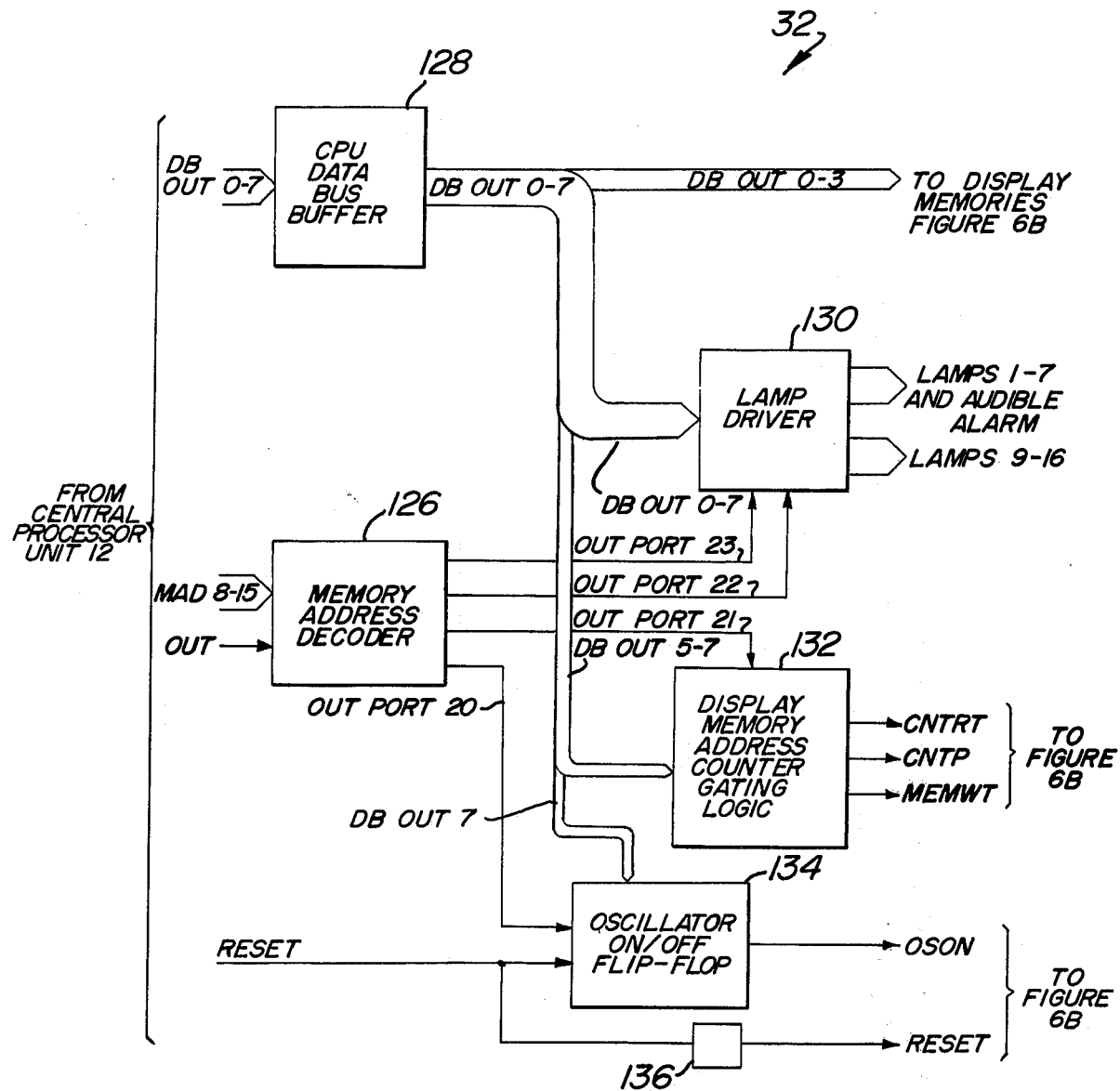

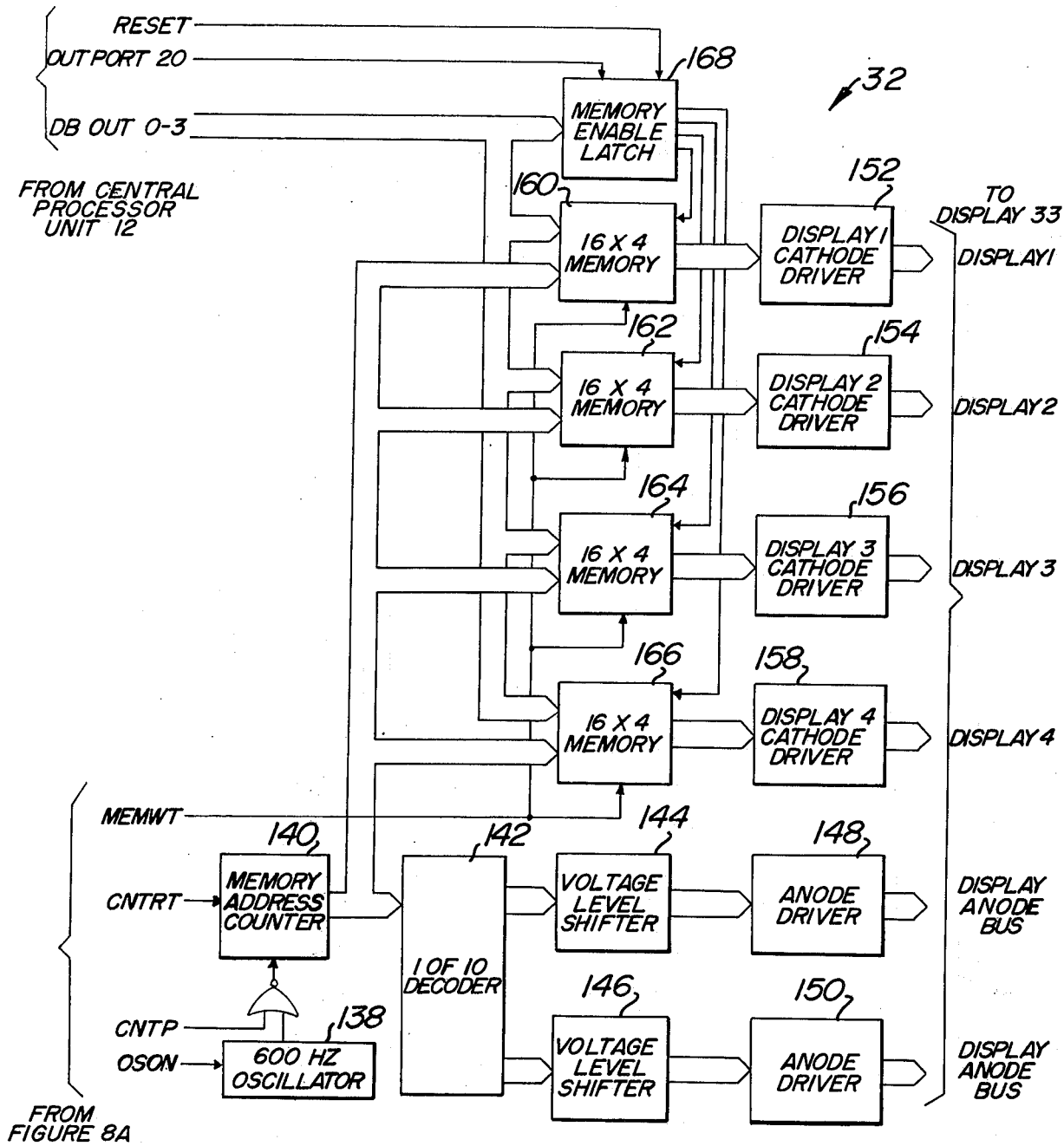
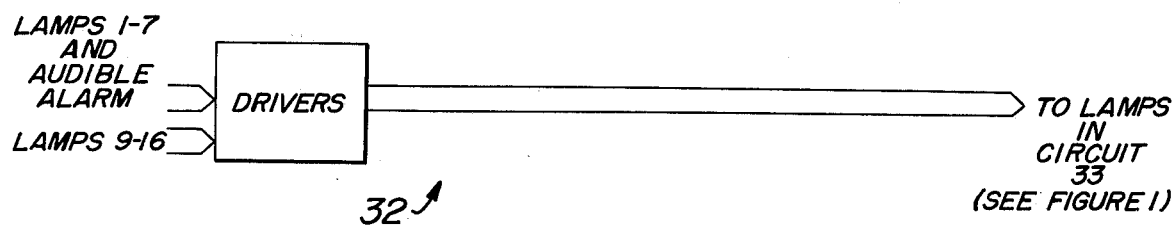
FIG. 6B
LAMP & DISPLAY INTERFACE AND DRIVER

REMITTANCE PROCESSOR

BACKGROUND OF THE INVENTION

The present invention is directed to a remittance processor for processing transaction documents, in the form of punched cards or OCR documents and remittance documents in the form of checks. In particular, the invention is directed to electronically reading a batch of transaction documents and encoding and endorsing an associated batch of remittance documents in a single operation.

Prior to the invention, most high-volume remittance processing operations involved receiving incoming remittance mail, including remittance documents (checks) and transaction documents or stubs (indicating amounts due), opening the mail, extracting the contents and sorting the contents into batches. The sorting operation usually involved a comparison between the dollar amounts written on the checks and a dollar written on the stub. If the check amount was written for the same amount as the stub, these payments were sorted into a "Full-Payment" batch. If the check and stub amounts did not agree, such payments were sorted into a batch of "Partial Payments". In addition, other types of payments were also sorted into specific batch classifications. Among these classifications are:

(1) Multiple document transactions (several stubs but one check);
(2) Multiple check transactions (one stub, but several checks);
(3) Multiple document, Multiple checks (several stubs and several checks);
(4) No-document (checks with no stub); and
(5) No-check (stubs with no check).

Of all these payment classifications, only the "Full Payment" batches required no special processing. A "Full-Payment" batch usually consisted of approximately 250 transactions, each transaction consisting of one check and one stub. To process these transactions, most methods involved separating a "Full-Payment" batch into two stacks of documents, one stack of checks and one stack of stubs. The stubs were usually taken to some type of reader-accumulator-printer apparatus which would read a stub, print the information read, and accumulate a dollar total of the dollar amount information read from each stub. After reading an entire batch of stubs, this apparatus would print out the accumulated dollar total for the batch.

Concurrent with the processing of stubs would be the encoding of associated checks. This operation is usually performed on a proof machine common in the banking industry. The encoder operator would grasp each check in the batch, index the dollar amount of the check into the proof machine keyboard, and then drop the check into the proof machine's document transport mechanism. The proof machine then encoded the indexed amount upon the check and endorsed the back side of the check with audit-trail information. The proof machine also accumulated a sum of the dollar amounts of each check and printed this sum at the completion of the encoding operation.

After a "Full-Payment" batch had been processed through the stub reader and its checks encoded, one final step remained to complete the process. The total dollar amount of the stubs (obtained by passing them through the reader-accumulator-printer) was compared with the total dollar amount of the checks (obtained from the proof machines). If the stub total and the check total agreed, the process was complete. If, however, the stub total and the check total did not agree, for example, as the result of a mis-sorted item or a keying error, then the entire batch required reprocessing by hand in order to identify and correct the error. This process was very time-consuming and therefore quite costly.

As an alternative, more recent processes provide apparatus which would allow complete processing of a payment at a single station. In such processes, the remittance mail is delivered un-opened to one or more stations. An operator opens the unsorted mail remittance, inserts the remittance stub into the station, and then indexes the dollar amount of the check onto the station's keyboard. The station reads the stub and compares the dollar amount read from the stub and compares the with the dollar amount indexed by the operator. If the two amounts agree, the station allows the check to be encoded with the indexed dollar amount, completing the transaction. If the two amounts do not agree, the station accepts commands regarding the disposition of the out-of-balance payment.

In comparison with the previously described batch process, the advantage of this single-station process is that each transaction, that is, each stub-check combination, is balanced one transaction at a time. Such a process elminates the need for final batch balancing step, as in a batch process and the time consuming, costly manual processing required if a batch is out-of-balance. The single-step process, however, has the severe disadvantage of relatively slow processing rates. An additional disadvantage of the single-step process is the labor-intensive operation required of an operator. The operator of a single-step station must manually open the remittance mail envelope, extract its contents, decide upon its disposition, insert the stub into the station, index the check amount into a keyboard, and wait for a response from the station regarding the possibility of still further processing required. Furthermore, the processing of special payments such as multiple documents and multiple checks requires additional operator intervention.

An advantage of the present invention is that the transaction documents or stubs are pre-batched allowing the process to employ automatic mail opening equipment.

An additional advantage of the invention is that an operator can utilize an automatic, mechanical-feed reader to greatly increase the processing of transactions.

Another advantage of the invention is that a plurality of interface circuits are of modular design and can be conveniently reconfigured or replaced without interferring with the operation of the encoder.

A futher advantage of the invention is that the encoder can be operated in conjunction with the remittance processor, or as a stand alone unit.

A still further advantage of the present invention is that the remittance checks can be encoded and endorsed in either of two modes: in response to information provided by an operator utilizing a keyboard or in response to information obtained automatically by the remittance processor.

Other advantages appear hereinafter.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is a block diagram of the card reader interface.

FIGS. 6A and 6B together comprise a block diagram of the lamp and display interface and driver circuit.

FIG. 7 is a switch panel for the remittance processor.

DISCLOSURE OF THE INVENTION

Figure 1:
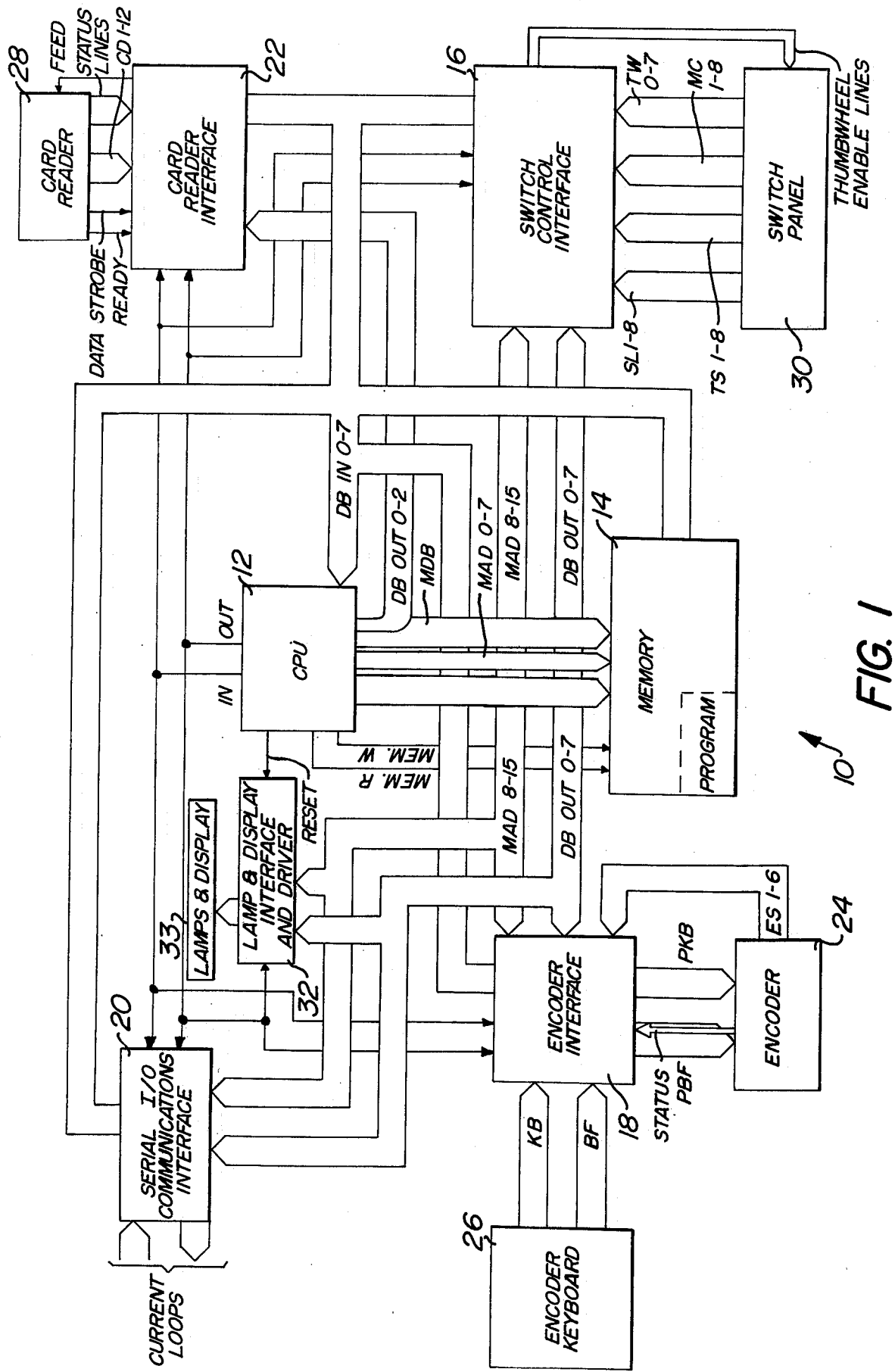
FIG. 1 is a block diagram of the remittance processor constructed in accordance with the principles of the present invention.

Referring to the drawings in detail, wherein like numerals indicate like elements, there is shown in FIG. 1 a remittance processor constructed in accordance with the principles of the present invention designated generally as 10. Remittance processor 10 includes a central processor unit 12 and an associated memory 14 for processing remittance data in accordance with a macro assembler program stored in the memory. The central processing unit 12 is a single integrated circuit micro processor chip such as an Intel 8080 CPU suitable for use in a general purpose digital computer system.

The central processor employs 8 bit words that are stored in the memory 14 by means of a 16 bit memory address bus. In the preferred embodiment described herein, the last 8 bit addresses of the memory address bus, designated MAD 8-15, are used for input and output port operations. Data is transferred between the central processor unit 12 and memory 14 over 8 bit data input and output buses. The 8 bits of input data are denoted DBIN0-DBIN7. The 8 bits of output data are designated DBOUT0-DBOUT7.

The output data DBOUT0-DBOUT7 is transmitted to a switch control interface circuit 16, an encoder interface circuit 18, serial I/O circuit 20 and a lamp and display interface and driver circuit 32 by means of the output data bus. If desired, a cassette or flopping disk interface can also be operated by the output data bus as will be apparent from the following description of the invention. The output data is captured by these interface circuits in response to the memory address signals MAD8-MAD15 appearing on the memory address bus. The memory address signals are decoded in each of the interface circuits to provide an "out port" of captured data from the central processor unit to the interface circuit or an "in port" of captured data from the interface circuit to the central processor unit. Each "port" therefore is defined with respect to the central processor unit. Each "port" comprises a byte of data which appears momentarily on the central processor unit data buses.

The central processor unit 12 also transmits 3 bits of data on its ouput data bus, denoted DBOUT0-DBOUT2, to a card reader interface 22. The flow of data between the central processor unit and interface circuits 16, 18, 20, 22 and 32 is controlled by the IN and OUT lines of the central processor unit. The IN and OUT signals are generated by the central processor unit in response to programmed instructions read from memory 14 and executed by the central processor unit.

The configuration of the central processor unit and memory and the functions of the data input and output and memory address buses are described in greater detail in "The Bugbook 3, Micro Computer Interfacing" published by E & L Instruments, Inc. of Derby, Conn. The structure of the central processor unit is described in the "Intel 8080 Microcomputer System Manual" (January 1975) published by Intel Corporation.

The central processor unit 12 and encoder interface circuit 18 control an encoder 24 having a keyboard 26. In the preferred embodiment described herein, the encoder 24 is a Burroughs S-100 series MICR encoder. The encoder encodes a remittance document in magnetic ink and endorses the backside of the document with the endorser's legend, the date and the serial number of the document. The endorser's legend may consist of its name and address, the routing number and encoder machine number.

The operation of the encoder in remittance processing is well-known and a detailed description thereof is deemed to be unnecessary. A detailed description of the encoder is provided in the "Burroughs Styles S 102/S 103 MICR and OCR Proof Encoders Reference and Operating Manual" published by the Burroughs Corporation of Detroit, Mich. The following brief description of the encoder is provided for convenience sake only.

The encoder comprises a document chute, encoding station, endorser, stack pocket, audit tape printer, keyboard and memory. A remittance document is released from the document chute and transported at a rate of about 75 inches per second to and from the encoding station.

At the encoding station, the document is transported at a rate of 2½ inches per second and the document is encoded in magnetic ink one character at a time by a fourteen position print wheel. During the encoding operation, the document is moving.

At the endorser, the back of the document is endorsed with the endorser's legend, the date and a serial number. The serial number is a five digit, non-resettable number which advances one unit at the conclusion of each endorsement. The endorser's legend usually includes the endorser's name and address, routing number and branch number and the encoder machine number. The data includes the month, day and year.

The audit tape printer is a high speed drum printer which prints one character at a time at a rate of 45 characters per second. The printer prints the serial number, transaction code (for example, credit or batch total), debit or credit amount, condition symbol (for example, in balance or out of balance) and register designation (for example, debit or proof).

The keyboard includes a plurality of numeric or data keys and operating keys. the encoder memory includes a keyboard buffer, input register and proof, debit and add mode accumulator registers. Data indexed on the keyboard is stored in the keyboard buffer. Depression of a control key initiates a machine cycle. Data stored in the keyboard buffer is transferred to the input register and added to the proof or debit register. The proof register is used to prove that debits and credits for each transaction are in balance. If the transaction is in balance, a credit arithmetic operation is performed and an in balance symbol is printed. If the transaction is not in balance, the credit arithmetic operation is inhibited and an out of balance symbol is printed. The debit register stores only debit amounts transferred from the input register. The add mode register is used to add and subtract listed amounts without disturbing the proof and debit accumulations.

The encoder keyboard is provided with a series of function and data lines. The function lines are designated BF and the data lines are designated KB in FIG. 1. The function lines determine the functional mode of operation of the encoder and also indicate the status of the encoder. For example, the function lines include the Transport line which provides power to the document transport, document encoder and audit tape printer; the Serial line which is used to synchronize the serial numbers printed by the audit tape printer and the endorser; the Endorse line which permits the operator to control the endorsement of the remittance document; the Add line which is used to add, subtract, subtotal and total listed amounts; the Auto line which permits automatic transport, encoding and endorsing of the remittance document without operator intervention; the Non-Balance line which indicates whether a debit and credit transaction is in or out of balance; the Printer Busy line which indicates that the audit audit tape printer is printing; the Encoder Busy line which indicates that an encoding operation is in progress; and the Document line which indicates that a remittance document is at the encoder station. The data lines are connected to the data and operation keys on the encoder keyboard. These lines carry the transaction information such as the amounts to be debited or credited, whether the operation to be performed by the encoder is a debit or credit operation, and whether the entered debits should be subtotaled or totaled.

In most high volume remittance processing operations, transaction documents in the form of punched cards and remittance documents in the form of checks are separately grouped into batches. The batches of transaction documents are numbered and fed to a document reader and printer. The printer prints the batch number, account number, transaction amount date and so forth for each transaction document. The batch of transaction documents and the printout are then delivered to an encoder operator. The remittance documents are kept in the same sequence as the transaction documents.

The amount of each remittance document is keyed into the encoder and the document is run through the encoder. The encoder encodes the remittance amount on the document in magnetic ink and prints the amount on the audit tape. When the batch of remittance documents has been processed by the encoder, the audit tape printer prints the total of the remittance amounts on the audit tape. The operator then compares this amount to the total of the tansaction amounts. If the two totals agree, the remittance and transaction documents are delivered to a computer facility for updating the accounts receivable.

If the totals do not agree, the transaction and remittance document print-outs must be compared by the operator item for item. This is costly and time-consuming. If a properly keyed-in remittance amount conflicts with the associated transaction amount, it indicates that the batches have been sorted erroneously. Accordingly, the transaction document must be pulled from the batch and updated to the remittance amount. The transaction document print-out must be corrected by hand. Both the individual transaction items and the total of the transaction items must be revised.

If a remittance amount was erroneously keyed into the encoder, the encoded amount on the remittance document must be corrected by feeding the remittance document a second time through the encoder. In addition, the remittance document audit tape must be corrected by hand.

In the present invention, the batch of transaction documents is electronically read and the remittance documents encoded in a single operation. In the preferred embodiments, the transaction documents are in the form of punched cards, although other input transaction documents such as mark sense or OCR may also be used. A card reader 28 such as a True Data Model 800 punch card reader mechanically feeds and reads each transaction card from a stack and feeds the information on the card to the central processor unit 12. The encoder interface 18 intercepts the encoder keyboard KB and BF lines and operates the encoder 24 in response to commands from the central processor unit.

The present invention is directed to a plurality of interface circuits of modular design which can be interconnected with a central processor unit 12 and a memory 14 in which a remittance processor program is stored to control a commercially available encoder 24 such as the Burroughs S-100 series encoder. The modular design of the system results in a high degree of reliability and flexibility since interface circuits are interchangeable.

The system permits control of the encoder 24 in either of two modes, a "key" mode and a "compare" mode. In both modes, the central processor unit is controlled by the program stored in memory 14. The operation of the remittance processor in each of these modes is described below.

Key Mode

In the key mode, the remittance documents and transaction documents are separated and batched sequentially. The batches are assigned batch control numbers and are delivered to the remittance processor for processing. The transaction documents are loaded as a batch into the card reader 28. In the preferred embodiment described herein, the card reader is a True Data Model 800 punch card reader, and the transaction documents are in the form of 80 column Hollerith cards. The remittance documents are placed in a check hopper in the encoder 24. A "Begin Batch" switch on the switch panel 30 is depressed to initialize the remittance processor 10 for operation.

The switch control interface transmits the "Begin Batch" signal to the central processor unit. The central processor unit clears the encoder proof and debit registers and determines whether there is a non-balance condition by sending the appropraite commands to the encoder on the PKB and PBF lines. The PKB and PBF lines simulate the KB and BF lines from the encoder keyboard 26, which lines would normally be connected to the encoder if the encoder were operated as a stand-alone unit. The encoder interface 18 checks the non-balance line in the PBF group and notifies the central processor unit whether the proof register was in or out of balance. If the register was out of balance, the central processor unit causes lamp and display interface and driver circuit 32 to energize an "Error" lamp in the lamps and display circuit 33 and the remittance processor 10 stops operation. The out of balance condition must then be corrected by the operator.

If the proof register was in balance, the central processor unit clears the encoder memory storage areas and causes the interface and drive circuit 32 to clear the lamps and display circuit 33.

The central processor unit then inspects a transaction batch header card via the card reader interface 22 to obtain an input record. The input record includes the transaction batch number and an action code which indicates whether the batch consists entirely of multiple transactions. Multiple transactions are described in a later portion of this specification. If a single transaction is indicated, the central processor unit causes interface and driver circuit 32 to energize an "Enter Batch Number" lamp in the lamps and display circuit 33, and the remittance processor waits for the remittance batch number to be keyed into the encoder keyboard. The remittance batch number is transmitted via the KB lines to the encoder interface 18 via the DBIN0-7 lines to the central processor unit. The central processor unit then compares the remittance batch number to the batch number read-off the transaction header card.

If the batch numbers do not match, the central processor unit causes the interface and driver circuit 32 to energize a "Re-Key" lamp in lamp and display circuit 33. The central processor unit then waits for a new remittance batch number to be keyed into the encoder keyboard. The central processor unit accepts the new batch number, causes the "Enter Batch Number" and "Re-Key" lamps to be turned off and the "Ready" lamp to be turned on and compares the remittance and document batch numbers.

If the batch numbers match, the central processor unit causes the encoder interface circuit 18 to generate the appropriate commands on the PKB and PBF lines to cause the encoder 24 to print the batch number on the audit tape. The central processor unit then causes the numeric display in lamp and display circuit 33 to be cleared. The lamps in circuit 33, however, are not cleared. In addition, the central processor unit clears certain of its registers, including a set of multiple transaction registers, and a transaction type field in the work area of memory 14. The multiple transaction registers are used to store transaction amounts during multiple transactions as described in a later portion of this specification. The transaction type field in the work area of memory 14 stores transaction type characters generated by the central processor unit. These characters are used by the central processor unit as described more fully below. Various transaction type characters are indicated below in Table I.

Table 1

| Transaction Type | Character |
|---|---|
| Indicates a skipped record | S |
| Indicates a multiple transaction record | D |
| Indicates multiple remittance amounts | X |
| Indicates a delete record | K |

The central processor unit instructs card reader 28 to read the next transaction card via the card reader interface 22. The next transaction card contains the first transaction amount to be processed in the batch. The card reader interface transmits an input record of the data on the transaction card to the central processor unit. The input record includes an action code and up to three transaction amounts. Each transaction amount is punched in one of three separate fields on the card designated "Field 1", "Field 2" and "Field 3". The various action codes are indicated below in Table 2.

Table 2

| Action | Code |
|---|---|
| End of data on transaction card | E |
| Transaction card cannot be read | R |
| Start of multiple transaction group | G |
| End of multiple transaction group | T |

Once the input record is obtained, the central processor unit examines the action code. If neither an E, R or G code is encountered, the central processor unit determines whether a data entry will take place in the key mode or compare mode. A "Compare/Key" rocker switch is provided on the switch panel 30 for this purpose. In the key mode, the rocker switch is moved to the "key" position.

The central processor unit causes the lamp and display interface and driver circuit 32 to display the transaction amount in Fields 1, 2 or 3 in response to commands received from a bank of switches denoted "Field 1", "Field 2", and "Field 3" on the switch panel 30 via switch control interface 16.

The operator reads the amount on the remittance document and keys it in on the encoder keyboard 26 to the encoder interface 18 via the KB lines. The encoder interface 18 transmits the information from the encoder keyboard to the central processor unit on the input data bus DBIN0-7.

The central processor unit then clears a transaction amount field in the work area of memory 14 and compares the remittance amount from the encoder interface 18 to the transaction amounts from Fields 1, 2 and 3 transmitted by the card reader interface 22.

If the remittance information is determined by the central processor unit 12 to match any of the fields of the transaction document information transmitted by the card reader interface, the central processor unit transfers the remittance amount to the transaction amount field in the memory work area. The central processor then causes the encoder interface 18 to transmit the remittance amount information to the encoder 24 via the PKB lines. The operator can then drop the remittance document in the encoders' transport. The encoder will encode the remittance document, endorse it, stamp it with audit trail information, and batch the document in response to the PKB and PBF information.

If the remittance information transmitted by the encoder interface to the central processor unit does not match any of the transaction document information fields, the central processor unit will transfer the remittance amount to the transaction amount field in the memory work area and inhibit the encoder interface 18 from transmitting the remittance information on the PKB lines. In addition, the central processor unit will cause the audible alarm and "Re-Key" light in lamp and display circuit 33 to be energized. The "Re-Key" light indicates to the operator that the remittance amount should be re-keyed into the encoder keyboard 26.

The operator then re-keys the remittance amount into the encoder keyboard 26. The new remittance amount may be identical to the old amount or it may be a corrected amount. The central proccessor unit causes the "Re-Key" light to be turned off. The new remittance amount is transferred by means of the KB lines, encoder interface 18 and the input data bus DBIN0-7 to the central processor unit. The new remittance amount is stored in a re-key register in the central processor unit. The transaction amount field of the memory work area is still occupied by the previous remittance amount. The central processor unit compares the new remittance information to the information in the the transaction document fields as previously described as well as the remittance information stored in the work area of the memory 14, in accordance with the program stored in memory. If the central processor unit determines that the remittance information matches the information in any of the transaction document fields or the work area of the memory, it causes the encoder interface to transmit the PKB and PBF information to the encoder 24. The operator drops the remittance document in the encoder's transport and the encoder automatically encodes the document with the new remittance amount, endorses it, stamps it with audit trail information, and batches the document.

Since the transaction documents are automatically read by the card reader 28, there is no delay in processing successive transactions. The transactions are processed as quickly as the operator can key the remittance amounts into encoder keyboard 26 and drop the remittance document into the encoder transport. The remittance amount keyed into the encoder keyboard is always verified, either by electronic comparison to the transaction document field information or by electronic comparison to the stored remittance information first keyed into the encoder keyboard in a re-key operation.

It should be appreciated that the key mode of operation does not require that the transaction documents be sorted according to single expected payments. Thus, the remittance information can be compared to as many as three fields of transaction document information. The transaction document fields can contain full payment information, partial payment information and minimum payment information.

Compare Mode

In the compare mode, the transaction documents must be sorted by amounts. Only "expected" payments can be processed in this mode. "Expected" payment amounts are full payments, minimum due payments or past due payments which are punched into the transaction cards according to the amounts on the remittance documents during the sorting and batching process.

In the compare mode, batch header numbers are verified as in key mode. THe card reader 28 automatically reads the field of the transaction document selected by one of the Field 1, 2 or 3 switches and transmits the transaction document information through the CD1-12 lines, card reader interface 22 and input data bus DBIN0-7 to the central processor unit. The central processor unit, in response, actuates the numeric display in display 32 to indicate the selected transaction document amount. The operator visually compares the remittance document amount to the displayed amount. If the amounts agree, the operator simply drops the remittance document into the encoder transport. The displayed amount is transferred by the central processor unit to the transaction amount field in the memory work area. The encoder will encode, endorse, stamp and batch the document in response to the PKB and PBF information from the encoder interface 18. The central processor unit transmits the transaction document information read off the transaction document card to encoder 24 by means of the encoder interface and the PKB lines.

In the compare mode, there is no key-in involved. The expected amount on the transaction document is read by the card reader and transferred to the central processor unit and the encoder interface to the encoder. There is no need for the operator to key the amount into the remittance processor.

Since the transaction documents are automatically read by the card reader, there is no delay in processing successive transaction documents. The remittance documents can be processed as quickly as the operator can make the visual comparison to the display transaction document amount and drop the remittance document in the encoder transport.

If a visual comparison of the remittance document and transaction document amounts indicates a discrepancy, this can only be due to an error in sorting the remittance and transaction documents prior to delivery to the remittance processor. If a discrepancy is noted, the operator merely moves the Compare/Key switch to the "key" position, keys the remittance amount into the encoder keyboard and follows the procedure in the key mode described above. Thus, the encoder interface will transmit the keyed-in remittance amount received from the KB lines to the encoder via the PKB lines and the encoder will encode the remittance document with the keyed-in amount. Operation can then be returned to the "compare" mode by returning the Compare/Key switch to the "compare" position.

In both the compare and key modes, the remittance processor 10 can perform a variety of special functions in response to a bank of switches located at switch panel 30. These include a set of push-button switches labeled "Skip", "Delete", "Look Ahead 1", "Look Ahead 2", and "Look Ahead 3". There is also a set of alternate action pushbutton switches labeled "Multiple Checks" and "No DOC".

The "Multiple Checks" switch is depressed to process multiple remittance documents corresponding to a single transaction document. The switch control interface 16 notifies the central processor unit that the "Multiple Checks" switch has been depressed via the central processor unit input data bus DBIN0-7. The central processor unit prevents the card reader interface 22 from advancing the current card through the hopper until each of the remittance documents corresponding to that card have been encoded by encoder 24 by transmitting data on a portion of its output bus DBOUT1-2 to the card reader interface. The operator keys in each remittance amount into the encoder keyboard 26 and this information is transferred over the KB lines through encoder interface 18 to the central processor unit input data bus DBIN0-7 and back through the interface to the encoder itself. The central processor unit clears a check accumulation register which, like the multiple transactions register, is part of the central processor unit. The encoder 24 is prevented from encoding any of the remittance documents with the information keyed into the encoder keyboard. The central processor unit keeps a running tally of the remittance amounts transmitted by the encoder interface by summing each keyed amount into the check accumulator register as long as the "Multiple Check" switch is in the operative position. In addition, the central processor unit stores the amount of each remittance document separately in memory 14. When the entire group of remittance documents corresponding to the card being read by card reader 28 has been keyed into the encoder, the operator depresses a "Total" key on the encoder keyboard. The central processor unit transfers the summation in the check accumulator register to a keyed amount register in the central processor unit and generates an X character in the transaction type field of the memory work area. The central processor then causes the summation to be printed out and compares the total amount for the group of remittance documents to the amount on the transaction document card.

If the amounts match, the remittance processor 10 then functions as previously described to process succeeding remittance payments and transaction document cards. If the amounts do not match, the "Re-Key" lamp is lighted and the audible alarm energized. The operator can then repeat the operation previously described by turning off the "Multiple Check" key and then returning it to the operative position, or he can process separately each of the remittance amounts previously keyed in and stored in the processor memory by keying in each remittance amount again. The central processor unit will cause each amount stored in memory to be displayed.

Multiple transaction cards corresponding to a single remittance document can be handled by the remittance processor 10. A transaction card is punched to indicate that a group of transaction documents corresponding to a single remittance document is being fed into the card reader.

If all transaction cards in a batch are part of a multiple transaction, the batch header card is punched with a special code. The code is read off the card by the card reader and transmitted through the card reader interface to the central processor unit. In response, the central processor unit causes a "Multiple Documents" light in lamp and display circuit 33 to be illuminated by means of lamp and display interface and driver circuit 32. Thereafter, the central processor unit illuminates the "Ready" light as previously described and waits for the correct batch number to be keyed into the encoder keyboard 26. After checking for action codes E and R, the central processor unit checks the status of the "Multiple Documents" light. If the light is on, it indicates that the entire batch of transaction cards corresponds to multiple transactions. Accordingly, the transaction card amount is transmitted to the multiple transaction accumulator register in the central processor unit. The central processor unit then inserts a D code, see Table 1 above, in the work area of the memory. The central processor unit then obtains the input record from the next transaction card and transmits the transaction amount to the multiple transaction accumulator for summation. Successive transaction are read in this manner and corresponding transaction amounts are accumulated in the multiple transaction accumulator. The end of a group of multiple transaction cards is marked by a trailer card punched with the action code T, see Table 2 above. When the central processor unit senses this action code, it moves the summation amount in the multiple transaction accumulator to the work area of the memory and clears the transaction type field. Thereafter, the central processor unit treats the summation amounts retrieved from the multiple transaction accumulator register as a single transaction amount and encodes, endorses and stamps the remittance document corresponding to the group of transaction cards as already described.

A batch of transaction cards may include a mix of single and multiple transaction cards. For a single transaction card, there is a single remittance document. These cards are processed as already described. Embedded in the batch, however, there may be two or more separate groups of multiple transaction cards, that is, two or more groups of cards for which there is a only one remittance document. The first transaction card in such a group would be punched with the action code G, see Table 2 above. For such a group of transaction cards, the central processor unit checks the E and R codes and the status of the "Multiple Document" light. The "Multiple Document" light will not be on when the G code is first encountered. The central processor unit must then check for the G code. When the central processor unit senses the G code, it causes the "Multiple Document" light to be illuminated and sets a "Turn-Off" flag. The next transaction card is read and its transaction amount is stored in the multiple transaction accumulator register. Succeeding cards are read and their amounts are also transmitted to the multiple transation accumulator register until a transaction card bearing a T action code is encountered. Such a card indicates the end of the multiple document group. At this time, the central processor unit transfers the summation from the multiple transaction accumulator register to the work area of the memory, clears the transaction type field, causes the "Multiple Document" light to be turned on and resets the "Turn-Off" flag. The remainder of the remittance processing operations performed by the central processor unit for multiple transactions is the same as the single transaction process described previously.

A prior transaction can be deleted by the remittance processor in response to depressing the "Delete" switch on switch panel 30. The switch control interface notifies the central processor unit as to whether the "Delete" switch is depressed via the input data bus DBIN0-7. If the "Delete" switch is depressed, the central processor unit causes the encoder interface to transmit a new set of PKB signals to the encoder. In response, the encoder corrects its proof and debit registers by deleting the last remittance amount accumulated in the registers. The central processor unit then causes the "Re-Key" light to be illuminated. The new remittance amount is keyed into the encoder keyboard and transmitted to the central processor unit. The central processor unit transfers the new remittance amount to the transaction amount field of the memory working area and causes the "Re-Key" light to be turned off. The central processor unit then causes the PKB and PBF signals to be transmitted to the encoder 24. In response, the encoder re-encodes the check. The PBF signals, however, cause the encoder to temporarily inhibit the endorser station since the check has already been endorsed. Thereafter, the central processor unit transfers a K character to the transaction type field of the memory working area. Successive checks are then coded and endorsed by the remittance processor as previously described.

A transaction document may also be intentionally skipped by the remittance processor 10. This is accomplished by depressing the "Skip" switch on switch panel 30. The switch control interface notifies the central processor unit that the transaction document should be skipped via input data bus DBIN0-7. The central processor unit generates an S character in the transaction type field of the memory work area and causes the encoder interface to transmit the proper PKB and PBF signals so that the encoder is inhibited from encoding and endorsing the remittance document which corresponds to the skipped transaction document. Thereafter, the remittance processor processes successive checks as previously described.

The operator may examine any of the next three transaction documents by depressing the appropriate "Look Ahead 1, 2 or 3" switch on switch panel 30. The card reader 28 reads the next three transaction documents and the card reader interface transmits the transaction document amounts to the central processor unit via input data bus DBIN0-7. The central processor unit transmits this information to the numeric display in display 33. The remittance processor returns to the current transaction document when the "Look Ahead" switch is released.

The operation of each interface circuit is described in greater detail below.

Card Reader Interface

The transaction card reading procedure is initiated by a Feed command generated by the card reader interface 22. See FIG. 2. The memory address bus MAD8-15 and the IN and OUT signals from the central processor unit 12 are transmitted to a memory address decoder 34. The decoding function of the memory address decoder is shown in Table 3 below.

Table 3

| Function | Port Signal |
|---|---|
| Mad $8\cdot 9\cdot 10\cdot 11\cdot \overline{12}\cdot \overline{13}\cdot \overline{14}\cdot \overline{15}$ + IN | In Port E |
| Mad $8\cdot 9\cdot 10\cdot 11\cdot \overline{12}\cdot \overline{13}\cdot \overline{14}\cdot \overline{15}$ + $\overline{OUT}$ | Out Port E |
| MAD $8\cdot 9\cdot 10\cdot 11\cdot \overline{12}\cdot \overline{13}\cdot \overline{14}\cdot 15$ + IN | In Port F |

The MAD8-15 information from the central processor unit is decoded by the memory address decoder 34 to determine whether a Feed signal should be transmitted to the card reader 28. The OUT signal from the central processor unit synchronizes the transmission of the Feed signal to the card reader according to the program instructions stored in memory 14. The OUT signal causes the memory address decoder to generate an Out Port E signal in response to the MAD8-15 information.

The Out Port E signal is transmitted to a feed pulse generator 36. The True Data card reader indicates that it is ready to read a card by generating a Ready signal at one of its output lines. The central processor unit generates a DBOUT0 signal on the output data bus which is transmitted to the feed pulse generator. The feed pulse generator generates a Feed signal in response to the Out Port E, DBOUT0 and Ready signals. In particular, the feed pulse generator incorporates a pair of NAND gates to generate the function [Out Port E DBOUT0 · Ready]. This function triggers a 74123 monostable multivibrator at the output end of the feed pulse generator. The multivibrator provides the Feed signal to the card reader.

In response to the Feed signal, the card reader picks a card from its hopper, reads the card and outputs card data CD1-12 to the card reader interface. In addition, while generating the feed signal, the feed pulse generator generates a Set signal which sets a Busy flip-flop 38 in response to detecting the function [Out Port E DBOUT0]. The Busy flip-flop may be a 7474 D-type edge triggered flip-flop with a grounded D input. After being set, the busy flip-flop generates a Busy Flag signal in response to a Busy signal from the card reader. The busy signal is transmitted to a tri-state gate in tri-state gating logic circuit 40. Tri-state gating logic circuit 40 comprises eight 74126 tri-state bus buffer gates with separate inputs and a common control line.

The Busy Flag signal indicates that the card reader is busy reading a card. The signal is transmitted to the central processor unit via the tri-state gating logic circuit 40 along with the information from the True Data card reader status lines when an In Port F signal is generated by the memory address decoder 34 at the control line of the gating logic circuit. The card reader status lines are conventional lines at the output of the True Data card reader. The lines indicate whether the card reader power is on or off, whether the card reader hopper is empty and so forth. The memory address decoder generates the In Port F signal in response to the MAD8-15 information and the IN signal generated by the central processor unit in accordance with the program stored in memory 14. The bush flip-flop is reset by the trailing edge of the Busy signal from the card reader.

The card reader data CD1-12 is in Hollerith code form. The card data CD1-12 is transmitted to a ASCII Encoder 42 which encodes the card data into ASCII code form. The ASCII Encoder 42 includes a 1702 programmable read-only memory containing information for performing the conversion from Hollerith to ASCII codes. The card data lines CD1-12 are used to address the programmable read-only memory. When card reader 28 reads the data from an entire column on the transaction document card, the card reader generates a Data Strobe signal. The Data Strobe signal is inverted to produce a read/write signal which is transmitted to the read/write terminal of a RAM Memory 46 such as an 8101 MOS random access memory. The state of the read/write signal determines whether data is written into or read out of memory 46.

The Data Strobe signal is in the form of a digital pulse. The write pulse generator includes a 74123 multivibrator which is triggered by the inverted Data Strobe pulse. The trailing edge of the pulse causes the write pulse generator to generate an Advance signal. The Advance signal increments a memory address counter 48. Memory address counter 48 may be an eight stage counter comprising two cascaded 7493 counters having their first stage outputs tied to their clock inputs. The counter 48 output lines MAC1-8 address the RAM memory 46 in response to the Advance signal generated by write pulse generator 44. Each time the Advance signal is generated, the memory address counter advances one count. This increments the RAM memory address to the next position. As the memory address is incremented, the Read/Write signal causes the ASCII information at the output of ASCII encoder 42 to be written into the addressed memory location. In this manner, all of the data columns on the transaction document card are stored sequentially in the RAM memory.

After all data columns are stored in the RAM memory and the card has completely been transported by the card reader read head, the card ready "Busy" line changes state and clears the busy flip-flop. This indicates to the central processor unit, via DBIN0-7, that the read operation has been completed. The output of the flip-flop therefore indicates that the card reader is no longer busy, that is, the card data is no longer being written into memory 46.

After the read operation is completed, the process of transferring the data to the central processor unit begins. The memory address counter 48 is reset to the first address location by a memory address reset logic circuit 50. The memory address reset logic 50 may be a simple series connected NAND gate and inverter. When the memory address decoder 34 generates another Out Port E signal and the central processor unit generates a DBOUT1 signal at its output bus, the memory address reset logic circuit 50 generates a Re-set signal. The Reset signal resets the memory address counter.

Thereafter, the central processor unit transmits the fresh MAD8-15 information and an IN signal to the memory address decoder 34 in accordance with the program stored in memory 14. In response, the memory address decoder generates a In Port E signal which enables the control line of tri-state gating logic circuit 41 to gate the first column of ASCII coded card data stored in RAM memory 46 onto the central processor unit input data bus DBIN0-7. Tri-state gating logic circuit 41 is identical to the circuit 40. The outputs of circuits 40 and 41 are tied together at the central processor input data bus. At this time, the information on the circuit 40 outputs are inhibited from being transmitted to the central processor unit input data bus.

The central processor unit then generates another set of MAD8-15 signals and a OUT signal to cause the memory address decoder 34 to generate an Out Port E signal in accordance with the program stored in memory 14. In addition, the central processor unit generates a DBOUT2 signal at its output data bus. In response, the write pulse generator 44 generates an Advance signal which increments memory address counter 48 to the next memory locaton. The memory address decoder 34 then generates another In Port E signal in response to the MAD8-15 and IN signals generated by the central processor unit in accordance with the program. This causes the tri-state gating logic circuit 41 to gate the ASCII Coded data for the second card column onto the central processor unit input data bus DBIN0-7. The process of incrementing memory address counter 48 and gating each column of stored card data onto the central processor unit input data bus is repeated until all data columns have been transmitted to the central processor unit.

Encoder Interface

Figure 3:
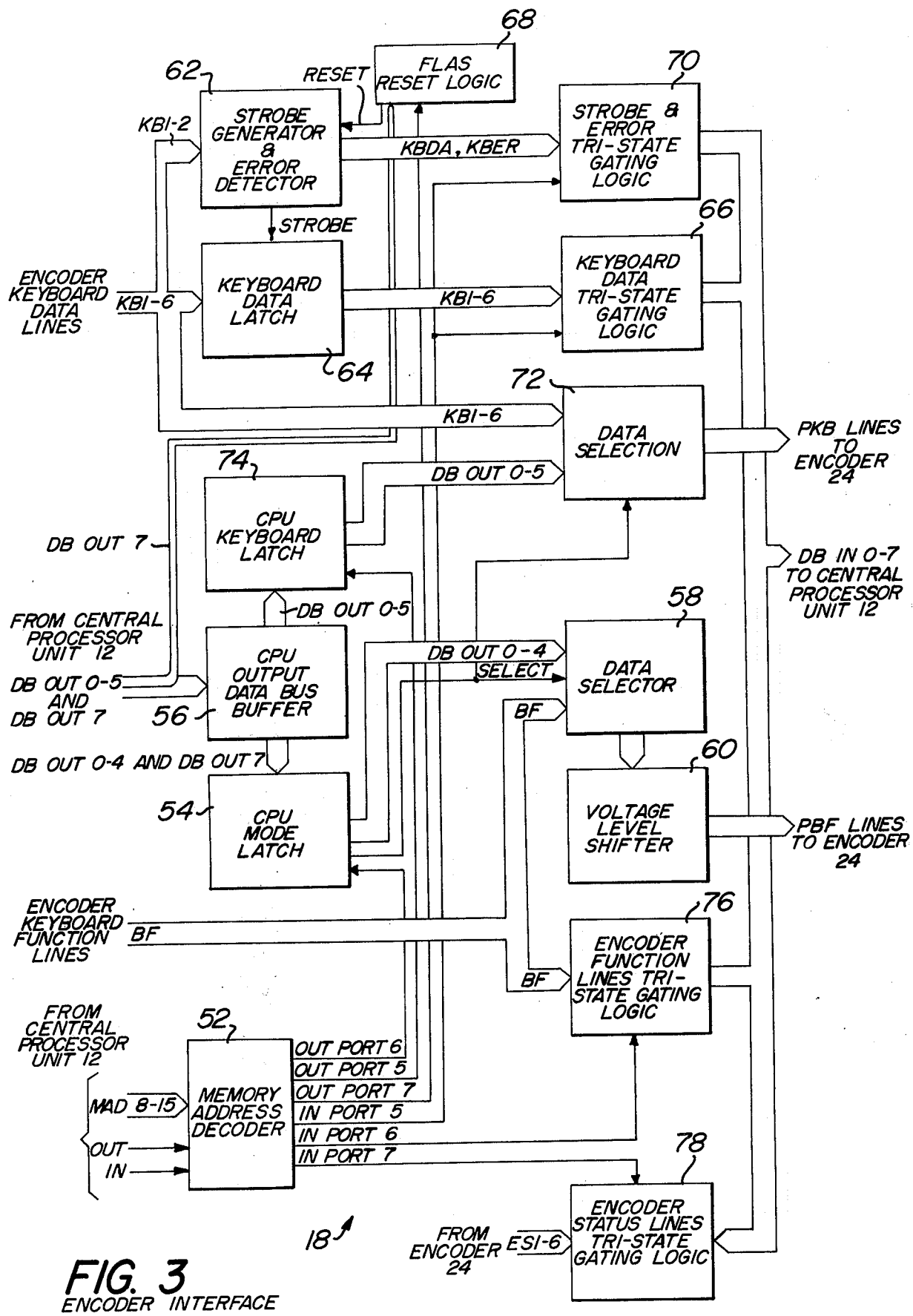
FIG. 3 is a block diagram of the encoder interface.

An advantage of the present invention is that the remittance processor 10 can be easily connected to an existing encoder such as the Burroughs S-100 series document encoders. No permanent interconnections to the encoder is required. The encoder interface 18 provides the digital logic for interconnecting the remittance processor 10 and encoder 24. See FIG. 3.

The encoder interface 18 electronically captures to KB and BF signals from the encoder keyboard 26 and regenerates simulated keyboard signals PKB and PBF to encoder 24.

The encoder interface 18 operates in either of two modes, an Enable mode and a Disable mode. The mode of operation of the encoder interface is determined by operation of an "Enable/Disable" switch on switch panel 30. In the Disable mode, the KB and BF signals taken from encoder keyboard 26 are regenerated by the encoder interface via the PKB and PBF lines to encoder 24 without processing by the central processor unit. The encoder interface does not alter the encoder keyboard signals in the Disable mode. Thus, in the Disable mode, the encoder 24 operates as if it were disconnected from the remittance processor 10. In other words, the encoder 24 can operate as a stand-alone unit when the remittance processor 10 is in the Disable mode.

In the Enable mode, the remittance processor 10 supervises the transmission of the PKB and PBF signals to encoder 24. The KB and BF signals generated by encoder keyboard 26 are reflected through the encoder interface 18 to the central processor unit 12. The central processor unit determines the appropriate operation of the encoder in accordance with the program stored in memory 14 and sends the appropriate set of signals to encoder 24.

Operation in the Enable or Disable mode is determined by memory address decoder 52 and CPU Mode Latch circuit 54. The decoding function of memory address decoder 52 is indicated in Table 4 below.

Table 4

| Function | Port Signal |
|---|---|
| MAD $\overline{8}$-$\overline{9}$-10-$\overline{11}$-$\overline{12}$-$\overline{13}$-$\overline{14}$-$\overline{15}$ + IN | In Port 5 |
| MAD $\overline{8}$-$\overline{9}$-10-$\overline{11}$-$\overline{12}$-$\overline{13}$-$\overline{14}$-$\overline{15}$ + $\overline{OUT}$ | Out Port 5 |
| MAD $\overline{8}$-9-10-$\overline{11}$-$\overline{12}$-$\overline{13}$-$\overline{14}$-$\overline{15}$ + $\overline{IN}$ | In Port 6 |
| MAD $\overline{8}$-9-10-$\overline{11}$-$\overline{12}$-$\overline{13}$-$\overline{14}$-$\overline{15}$ + $\overline{OUT}$ | Out Port 6 |
| MAD 8-9-10-$\overline{11}$-$\overline{12}$-$\overline{13}$-$\overline{14}$-$\overline{15}$ + $\overline{IN}$ | In Port 7 |
| MAD 8-9-10-$\overline{11}$-$\overline{12}$-$\overline{13}$-$\overline{14}$-$\overline{15}$ + $\overline{OUT}$ | Out Port 7 |

Memory address decoder 52 decodes the central processor unit memory address bus lines MAD8-15 and generates a series of In Port and Out Port signals in response to the memory address information and the central processor unit IN and OUT signals. In particular, the Out Port signals are generated in response to the OUT input and the IN Port signals are generated in response to the IN input. All inputs to the memory address decoder 52 are generated by the central processor unit in response to the program stored in memory 14.

The Out Port 6 signal generated by memory address decoder 52 clocks or strobes the output data from a CPU output data bus buffer 56 into the CPU mode latch circuit 54. CPU mode latch 54 may be a pair of 74175 quadruple D-type flip-flops with a common clock line operated by the Out Port 6 signal. In response to the DBOUT7 input, the CPU mode latch circuit generates a Select signal which causes a data selector 58 to selectively transmit the BF encoder function line signals or the DBOUT0-4 central processor unit signals to a voltage level shifter 60. That is, DBOUT7 selects either the disable or enable mode. The data selector 58 may be a pair of 74157 quadruple 2 line to 1 line data selectors with common select lines operated by the Select signal. The outputs of the voltage level shifter 60 are the PBF function signals which are sent to encoder 24. These signals simulate the BF signals which are available at the output of encoder keyboard 26. The output of data selector 58 is determined by the state of the Select signal generated by the CPU mode latch circuit 54. The state of the Select signal is in turn determined by the state of the DBOUT7 signal at the input to CPU mode latch 54. The output signals on the central processor unit output data bus, including the DBOUT7 signals, are generated by the central processor unit in accordance with the program stored in memory 14. If the DBOUT7 signal is "high", (enable mode) the Select signal will cause the data selector 58 to transmit the DBOUT0-4 central processor unit data signals to the voltage level shifter 60. The DBOUT0-4 signals simulate the BF signals available at encoder keyboard 26. If the DBOUT7 is "low" (disable mode), the Select signal will cause the data selector 58 to transmit the BF encoder function signals directly from the encoder keyboard to the voltage level shifter 60. The state of the DBOUT7 signal is determined by the central processor unit in accordance with the state of the "Enable/Disable" switch on switch panel 30. Thus, in the Enable mode, the DBOUT7 signal is "high" and the central processor unit signals DBOUT0-4 are transmitted to the voltage level shifter 60 and the PBF signals are generated in response to the DBOUT0-4 signals. In the Disable mode, the DBOUT7 signal is "low" and the BF encoder control signals are reflected directly from encoder keyboard 26 to the voltage level shifter 60.

In the preferred embodiment described herein, the encoder keyboard 26 is part of the Burroughs S-100 series encoder. The KB data signals generated by encoder keyboard 26 comprise six lines denoted KB1-6. Each of the KB1-6 lines represents a digit in a 6 bit binary word. Each word represents a key of the keyboard. The least significant digit in the code is the KB2 signal. The KB1 signal is the complement of the KB2 signal. When a key is depressed, the KB2-6 signals provide a numerical indication of the depressed key. The KB1 signal is used for error detection purposes.

The KB1 and 2 signals are transmitted to a strobe generator and error detector circuit 62 comprising separate strobe generator and error detector portions (not shown). The KB1 and 2 signals are NANDed in the strobe generator portion of the circuit to provide a KBDA signal which indicates that data is available from the encoder keyboard. For this purpose the strobe generator portion of circuit 62 is provided with a NAND gate connected at its input to the KB1 and 2 lines and at its output to a strobe generator bounce filtering circuit. The output of the bounce filtering circuit clocks a strobe generator flip-flop at the output end of the strobe generator portion of the circuit. The data input of the strobe generator flip-flop is grounded. The flip-flop generates a KBDA signal in response to the KB1 and 2 signals when a key is depressed on the encoder keyboard 26. The output of the bounce filtering circuit is also transmitted via a Strobe line to a keyboard data latch circuit 64. Latch circuit 64 may be a pair of 74175 qaudruple D-type flip-flops with a common clock line connected to the strobe line. The signal on the Strobe line input to keyboard data latch circuit 64 strobes the KB1-6 keyboard data signals through the keyboard data latch circuit to a keyboard data tri-state gating logic circuit 66. Each of the keyboard data latch circuit output lines represents one of the KB signals. Circuit 66 comprises a bank of tri-state gates having a common control line operated by an In Port 5 signal from memory address decoder 52. Each of the gates is connected to an output line of the keyboard data latch circuit 64.

The KB1 and 2 signals are NORed in the error detection portion of circuit 62 to provide a KBER signal which indicates that a keying-in error, such as key rollover, has occurred. For this purpose, the error detector portion of circuit 62 comprises a NOR gate connected at its input to the KB1 and 2 lines and at its output to an error detector bounce filtering circuit. The output of the bounce filtering circuit is in turn connected to the set input of an error detector flip-flop at the output end of the error detector portion of the circuit. The error detector flip-flop is clocked by the output of the strobe generator bounce filtering circuit in the strobe genera-tor portion of circuit 62. The data input of the error detector flip-flop is connected to the output of the strobe generator flip-flop in the strobe generator portion of circuit 62. The error detector flip-flop generates a KBER signal whenever two keys are simultaneously depressed or consecutively depressed without first resetting the KBDA signal.

The strobe generator and error detector circuit 62 is reset by an Out Port 7 signal at the output of memory address decoder 52 in conjunction with a DBOUT7 signal on the central processor unit output data bus. The Out Port 7 signal is generated by the memory address decoder 52 in response to the MAD8-15 signals on the central processor unit memory address bus and the OUT signal generated by the central processor unit in accordance with the program stored in memory 14. The Out Port 7 and DBOUT7 signals are NANDed by a flag reset logic circuit 68 to generate a Reset signal which resets strobe generator and error detector circuit 62, flip-flop. If two adjacent keys on the encoder keyboard 26 are simultaneously depressed or if two keys are consecutively depressed without clearing the strobe generator and error detector circuit 62 flip-flop circuit 62 generates the KBER signal.

The KBDA and KBER signals generated by the strobe generator and error detector 62 are transmitted to a strobe and error tri-state gating logic circuit 70. The outputs of strobe and error tri-state gating logic circuit 70 and the keyboard data tri-state gating logic circuit 66 are connected in parallel to the input data bus DBIN0-7 of the central processor unit 12. When the memory address decoder 52 generates an In Port 5 signal, tri-state gating logic circuits 70 and 66 transmit the KBDA and KBER and the KB1-6 signals, respectively, to the central processor unit input data bus DEIN0-7. The In Port 5 signal is generated by memory address decoder 52 in response to the MAD8-15 signals on the central processor unit memory address bus and the IN signal generated by the central processor unit in accordance with the program stored in memory 14. The central processor unit will not accept the KB1-6 signals if the KBER signal indicates that a key in key-in error has been committed.

The KBDA, KBER and KB1-6 signals are transmitted to the central processor unit input data bus only when the remittance processor 10 is in the Enable mode. Thus, the In Port 5 signal will be generated by the memory address decoder 52 only in the Enable mode, that is, only when the "Enable/Disable" switch on switch panel 30 is in the "enable" position. In addition, in the Enable mode, the Select signal generated by CPU mode latch circuit 54 causes a data selector 72 to transmit the outputs of a CPU keyboard latch circuit 74 via the PKB lines to encoder 24. The CPU keyboard latch 74 may be a pair of 74175 quadruple D-type flip-flops having common clock lines connected to the Out Port 5 line from memory address decoder 52. The DBOUT0-5 outputs of the CPU keyboard latch circuit 74 represent the simulated keyboard data signals transmitted to the PKB input lines to encoder 24. An Out Port 5 signal generated by memory address decoder 52 strobes the DBOUT0-5 signals at the CPU output data bus buffer outputs through the CPU keyboard latch circuit 74 to data selector 72. The memory address decoder 52 generates the Out Port 5 signal in response to the MAD8-15 signals on the central processor unit memory address bus and the OUT signal generated by the central processor unit in accordance with the program stored in memory 14. In the Enable mode, the Select signal generated by the CPU mode latch circuit 54 causes data selector 72 to transmit the CPU keyboard latch circuit 74 outputs to the PKB input lines to encoder 24.

In the Disable mode, the Select signal generated by CPU mode latch circuit 54 causes the data selector circuit 72 to transmit the keyboard data signals KB1-6 directly to the PKB inputs to encoder 24. The MAD8-15 and IN and OUT signals generated by the central processor unit in the Disable mode inhibits the memory address decoder from causing the strobe and error tri-state gating logic circuit 70 and the keyboard data tri-state gating logic circuit 66 to transmit the KBDA, KBER and KB1-6 signals to the central processor unit.

As mentioned previously, the functional modes of operation of encoder 24 are determined by operating conventional function switches at the encoder keyboard. The functional switches are designated "Endorse", "Serial", "Auto", "Add" and "Repeat" in the Burroughs S-100 series encoder. The operation of the encoder in response to each of these switches is well-known. The outputs of these switches is designated BF in FIG. 3. The BF signals are transmitted to an encoder function lines tri-state gating logic circuit 76. Gating logic circuit 76 comprises a bank of tri-state gates having a common control line operated by the In Port 6 output of memory address decoder 52. In the Enable mode, memory address decoder 52 generates the In Port 6 signal in response to the MAD8-15 signals on the central processor unit memory address bus and the IN signal generated by the central processor unit in accordance with the program stored in memory 14. The outputs of gating logic circuit 76 are connected in parallel with the outputs of gating logic circuits 66 and 70. The In Port 6 signal causes gating logic circuit 76 to transmit the BF signals to the central processor unit input data bus DBIN0-7.

As mentioned previously, in the Enable mode, the Select signal generated by CPU mode latch circuit 54 causes data selector 58 to transmit the DBOUT0-4 outputs to the voltage level shifter 60. The voltage level shifter 60 transmits these signals to the PBF input lines to encoder 24. The DBOUT0-4 signals represent the central processor simulated function switch signals BF. In the Disable mode, however, the Select signal generated by CPU mode latch circuit 54 causes data selector 58 to transmit the BF signals directly from encoder keyboard 26 to the voltage level shifter circuit 60 and onto the PBF input lines to encoder 24. In this mode, the central processor unit inhibits memory address decoder 52 from generating an In Port 6 signal to the encoder control lines tri-state gating logic circuit 76. Accordingly, the BF signals are not transmitted to the central processor unit in the Disable mode and the encoder 24 operates as a stand-alone unit.

Information relating to the status of encoder 24 may be transmitted to the central processor unit 12 for use in the program stored in memory 14. In the preferred embodiment described herein, information relating to the status of a Burroughs S-100 series encoder is available at the ES1-6 encoder output lines. The ES1-6 lines are conventional lines available at the output of the encoder. See FIG. 1. The ES1 line indicates that a remittance document is present at the encoder station; that ES2 line indicates that the encoder's power is on; the ES3 lines indicates that the encoder is in a non-balance condition; the ES4 line indicates that the encoder transport is on; the ES5 line indicates that the encoder is busy encoding a remittance document; and the ES6 line indicates that the encoder audit tape printer is busy.

In the Enable mode, the memory address decoder 52 generates an In Port 7 signal in response to the MAD8-15 signals on the central processor unit memory address bus and the IN signal generated by the central processor unit in accordance with the program stored in memory 14. The In Port 7 signal operates an encoder status lines tri-state gating logic circuit 78. The gating logic circuit comprises a bank of tri-state gates having a common control line operated by the In Port 7 signal. The outputs of gating logic circuit 78 are connected in parallel with the outputs of gating logic circuits 66, 70 and 76 to the central processor unit input data bus. The In Port 7 signal causes the gating logic circuit 78 to transmit the ES1-6 signals to the central processor unit input data bus.

In the Disable mode, the central processor unit inhibits memory address decoder 52 from generating the In Port 7 signal at the input to tri-state gating logic circuit 78. Accordingly, the ES1-6 signals are not transmitted to the central processor unit data bus in the Disable mode.

Switch Control Interface

Figure 4:
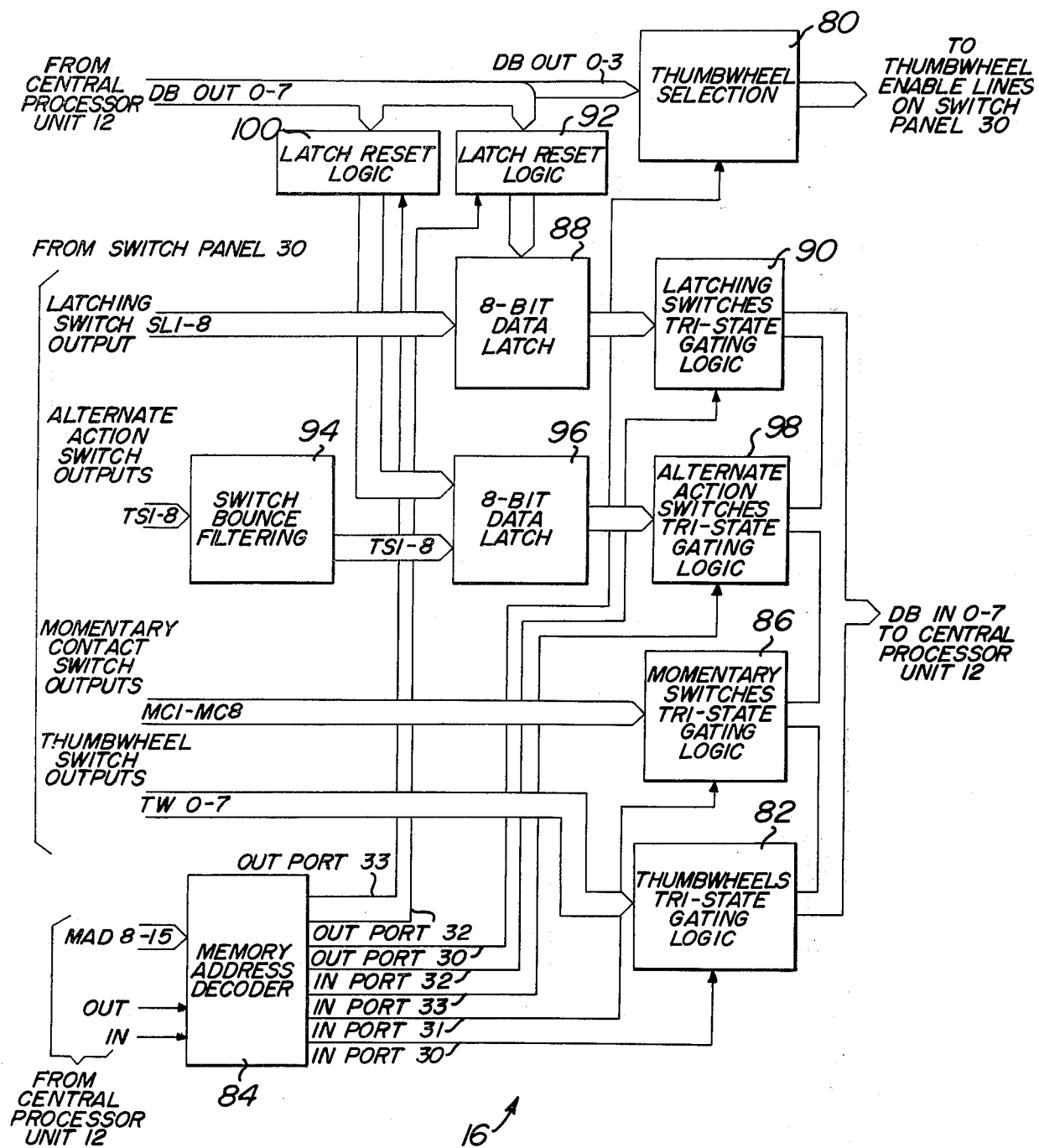
FIG. 4 is a block diagram of the switch control interface.

The switch control interface 16 captures data from a variety of types of switches on switch panel 30. This data is multiplexed and transmitted to the central processor unit input data bus DBIN0-7. See FIG. 4.

Switch panel 30 includes a plurality of thumb wheel switches for providing information to the central processor unit as to the month, day, year and encoder machine number used in endorsing a remittance document. It is preferred that the switch panel 30 include at least eight such switches which are divided into four pairs or sets. The eight output lines of the thumb wheel switches is denoted TW0-7. The thumb wheel switch lines TW0-7 are polled in sets of two so that, at any given instant of time, only one set of thumb wheel switches provides information to the central processor unit. The central processor unit output data bus signals DBOUT0-3 poll the thumb wheel switches by means of a thumb wheel selection logic circuit 80.

Thumb wheel selection logic circuit 80 generates an enable signal on one of four output lines each of which is connected to a set of thumb wheel switches. When thumb wheel selection logic circuit 80 energizes an enable line, its associated set of thumb wheel switches provides information to the central processor unit via a thumb wheels tri-state gating logic circuit 82.

Thumb wheel selection logic circuit 80 may be a 74175 quadruple D-type flip-flop which is strobed by an Out Port 30 line of memory address decoder 84. The sets of thumb wheel switches are polled in response to the states of the DBOUT0-3 signals generated by the central processor unit on its output data bus. A typical polling code is indicated in Table 5 below.

Table 5

| Thumbwheel Set Enabled | DBOUT3 | DBOUT2 | DBOUT1 | DBOUT0 |
|---|---|---|---|---|
| TW0, 1 | 0 | 0 | 0 | |
| TW2, 3 | 0 | 0 | 1 | 0 |
| TW4, 5 | 0 | 1 | 0 | 0 |
| TW6, 7 | 1 | 0 | 0 | 0 |

The particular set of thumb wheel switches enabled by the polling code of the central processor unit output data signals DBOUT0-3 provides a pair of input signals to the thumb wheels tri-state gating logic circuit 82. These signals are gated through the gating logic circuit onto the input data bus DBIN0-7 of the central processor unit in response to the In Port 30 signal generated by memory address decoder 84. The tri-state gating logic circuit comprises a bank of tri-state gates having a common control line operated by the In Port 30 signal. Memory address decoder 84 generates the In Port 30 signal in response to the MAD8-15 signals and the IN signal generated by the central processor unit in accordance with the program stored in memory 14. The decoding function of memory address decoder 84 is indicated in Table 6 below.

Table 6

| Function | Port Signal |
|---|---|
| $\overline{MAD\ 8\cdot 9\cdot \overline{10}\cdot \overline{11}\cdot 12\cdot 13\cdot \overline{14}\cdot \overline{15}} + \overline{IN}$ | In Port 30 |
| $\overline{MAD\ 8\cdot 9\cdot \overline{10}\cdot \overline{11}\cdot 12\cdot 13\cdot \overline{14}\cdot \overline{15}} + \overline{IN}$ | Out Port 30 |
| $\overline{MAD\ 8\cdot \overline{9}\cdot \overline{10}\cdot \overline{11}\cdot 12\cdot 13\cdot \overline{14}\cdot \overline{15}} + \overline{IN}$ | In Port 31 |
| $\overline{MAD\ \overline{8}\cdot 9\cdot \overline{10}\cdot \overline{11}\cdot 12\cdot 13\cdot \overline{14}\cdot \overline{15}} + \overline{IN}$ | In Port 32 |
| $\overline{MAD\ \overline{8}\cdot 9\cdot \overline{10}\cdot \overline{11}\cdot 12\cdot 13\cdot \overline{14}\cdot \overline{15}} + \overline{OUT}$ | Out Port 32 |
| $\overline{MAD\ 8\cdot \overline{9}\cdot \overline{10}\cdot \overline{11}\cdot 12\cdot 13\cdot \overline{14}\cdot \overline{15}} + \overline{IN}$ | In Port 33 |
| $\overline{MAD\ 8\cdot 9\cdot \overline{10}\cdot \overline{11}\cdot 12\cdot 13\cdot \overline{14}\cdot \overline{15}} + \overline{OUT}$ | Out Port 33 |

The switch control interface 16 also transmits information from a bank of momentary contact switches MC1-MC8, alternate action switches TS1-TS8 and latching switches SL1-SL8 to the central processor unit input data bus DBIN0-7. The momentary contact switches include the "Multiple Check", "No DOC", "Look Ahead 1, 2 and 3", "Compare/Key" and "Enable/Disable" switches. The outputs of these switches are connected to a momentary switches tri-state gating logic circuit 86. Gating logic circuit 86 may be a bank of tri-state gates having a common control line operated by the In Port 31 output of memory address decoder 84. The momentary switch outputs are transmitted by gating logic circuit 86 to the central processing unit input data bus DBIN0-7 in response to the generation of the In Port 31 signal by memory address decoder 84. The In Port 31 signal is generated by memory address decoder 84 in response to the MAD8-15 signals and the IN signal generated by the central processor unit in accordance with the program stored in memory 14. The operation of the central processor unit and the encoder has already been described in connection with each of the momentary contact switches. The operation of the central processor unit in the "Compare" and "Key" modes in response to the momentary switches is controlled by the program stored in memory 14.

The switch control interface transmits the SL1-SL8 outputs of the latching switches located at the switch panel 30 through an eight bit data latch circuit 88 and a latching switches tri-state gating logic circuit 90 to the input data bus of the central processor unit in response to a In Port 32 signal at the output of memory address decoder 84. The In Port 32 signal is generated by memory address decoder 84 in response to the MAD8-15 signals generated by the central processor unit at its memory address bus and the IN signal generated by the central processor unit in accordance with the program stored in memory 14. The eight bit data latch circuit 88 may include a bank of eight latching flip-flops having separate clock inputs operated by the associated latching switch outputs SL1-SL8. Each flip-flop has its data input coupled to a "high" or binary logic "1" voltage. The latching switch tri-state gating logic circuit 90 includes a bank of tri-state gates having a common control line operated by the In Port 32 signal.

The latching switches include "Skip", "Delete" and "Begin Batch" switches. The mode of operation of the central processor unit in response to the program stored in memory 14 in connection of each of these switches has already been described. The 8 bit data latch circuit is software resettable by means of a latch reset logic circuit 92 in response to an Out Port 32 signal generated by the memory address decoder 84 in combination with the the central processor unit output data signals DBOUT0-7. The latch reset logic circuit comprises a bank of NAND gates, each gate being connected to the reset terminal of a flip-flop in circuit 88. The NAND gates have a common input connected to the Out Port 32 line from memory address decoder 84. Each NAND gate NANDS the Out Port signal with one of the DBOUT0-7 signals to reset its associated flip-flop. Thus, at the appropriate point in the program, the central processor unit generates a particular combination of MAD8-15 signals, an OUT signal, and a particular combination of data output signals DBOUT0-7. In response, the memory address decoder 84 generates the Out Port 32 signal and the latch reset logic circuit 92 generates a reset signal at one of its output terminals to reset the appropriate flip-flop in the eight bit data latch circuit 88.

The switch control interface transmits the TS1-TS8 outputs of the alternate action switches to the input data bus of the central processor unit via a switch bounce filtering circuit 94, an 8 bit data latch circuit 96 and an alternate action switches tri-state gating logic circuit 98. The switch bounce filtering circuit 94 includes a bank of 4050 buffer gates each having a capacitive coupled input and output. The input of each buffer is connected to an alternate action switch output line. The output of each buffer is connected to the 8 bit data latch circuit 96. Latch circuit 96 is identical to latch circuit 88 except for the data input connections. In latch circuit 96, the data input of each flip-flop is connected to its complementary output. The outputs of 8 bit data latch 96 are transmitted to the alternate action switches tri-state gating logic circuit 98. Gating logic circuit 98 comprises a bank of tri-state gates having a common control line operated by the In Port 33 output of memory address decoder 84. Gating logic circuit 98 transmits the alternate action switch signals to the central processor unit input data bus DBIN0-7 in response to the In Port 33 signal. The memory address decoder 84 generates the In Port 33 signal in response to the MAD8-15 memory address signals in the IN signal generated by the central processor unit in accordance with the program stored in memory 14.

The alternate action switches TS1-TS8 include the Field Select 1, 2 and 3 switches. The operation of the central processor unit in response to the program stored in memory 14 in connection with each of these switches has already been described. Each of the flip-flops in latch circuit 96 are resettable by consecutive activations of the associated TS1-8 switch. When the switch is first activated, the appropriate flip-flop in 8 bit data latch circuit 96 is set. The next activation of the switch clocks the appropriate flip-flop back to the reset condition. In addition, each flip-flop in the eight bit data latch circuit is software resettable by a latch reset logic circuit 100 in response to an Out Port 33 signal generated by memory address decoder 84 in combination with a DEBOUT0-7 signal generated by the central processor unit. The latch reset logic circuit 100 is identical to latch reset logic circuit 92. Thus, latch reset logic circuit 100 comprises a bank of NAND gates each of which resets an associated flip-flop in the 8 bit data latch circuit 96. Each NAND gate NANDs the Out Port 33 signal with one of the DBOUT0-7 signals to reset its associated flip-flop.

Serial I/O Communications Interface

The serial I/O communications interface 20 facilitates data communication between remittance processor 10 and external devices such as a teletype, main frame computer, paper tape reader and so forth. The serial I/O communications interface accommodates data reception and transmission at a plurality of baud rates and data formats. The interface is connectable to both active and passive current loop devices.

Figure 5:
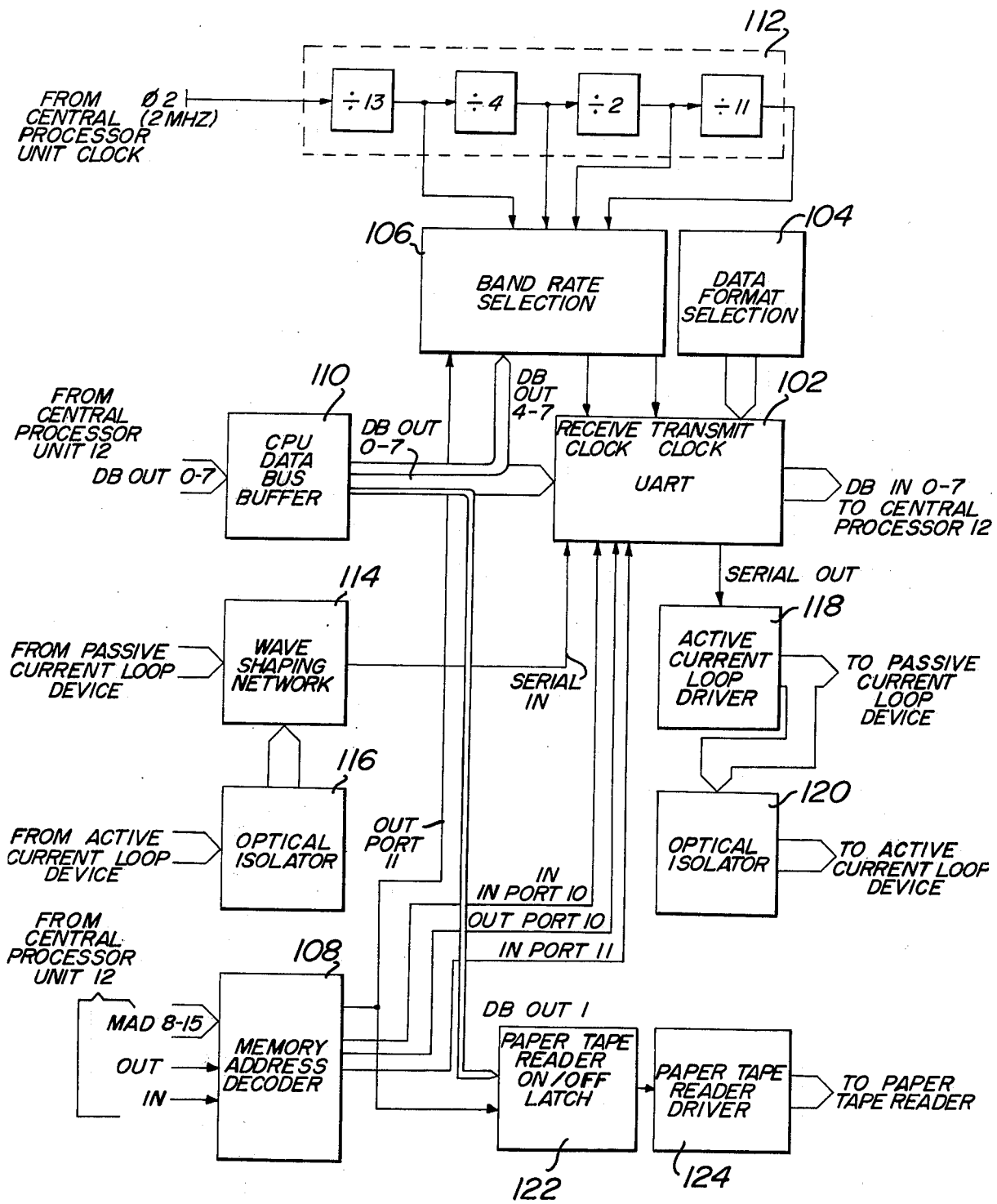
FIG. 5 is a block diagram of the serial I/O communications interface.

The serial I/O communications interface includes a universal asynchronous receiver transmitter (UART) 102. See FIG. 5. The UART may be a General Instruments AY5-1013 universal asynchronous receiver transmitter. The UART contains an asynchronous 8 bit receiver and an independent asynchronous 8 bit transmitter. The transmitter output is tri-state. This enables the transmitter outputs to be bussed with other output devices on the central processor unit input data bus DBIN0-7. The transmitter and receiver are independent of each other and may operate simultaneously at different clock rates. The UART is provided with a control section which programs the receiver and transmitter data format for 5, 6, 7 or 8 data bits, 1 or 2 stop bits, even or odd parity and parity or no parity. The control section is programmed by a data format selection circuit 104 which comprises a bank of switches which can be operated to apply a "high" or "low" signal to the UART data format terminals.

A baud rate selection network 106 controls the UART receiver and transmitter baud rates. The outputs of the baud rate selection network 106 are connected to the Receive Clock and Transmit Clock inputs of the UART. The Receive and Transmit Clock inputs of the UART can accommodate signal frequencies from 0 to 640 Khz. The Transmit Clock input frequency is 16 times the frequency of the UART Serial Out signal. The Receive Clock input frequency is 16 times the frequency of the Serial In signal. Thus, the Serial In and Out signal frequencies vary from 0 to 40 Khz.

The structure and function of a universal asynchronous receiver transmitter is described in greater detail in "The Bugbook IIA — The Universal Asynchronous Receiver/Transmitter and 20mA Current Loops" published by E & L Instruments, Inc. of Derby, Conn.

Selection of the transmitting and receiving baud rates is a software function of the MAD8-15 signals, the OUT signal, and the data output signals DBOUT0-7 generated by the central processor unit.

Four baud rates, 110 baud, 1200 baud, 2400 baud and 9600 baud may be used by the UART in connection with the baud rate selection network 106. The baud rate selection network 106 clocks the Receive and Transmit clock inputs of the UART at the appropriate rates in response to an Out Port 11 signal at the output of memory address decoder 108. The decoding function of memory address decoder 108 is indicated in Table 7 below.

Table 7

| Function | Port Signal |
|---|---|
| $\overline{MAD\ 8\cdot 9\cdot \overline{10}\cdot \overline{11}\cdot 12\cdot 13\cdot 14\cdot \overline{15}}$ + $\overline{IN}$ | In Port 10 |
| $\overline{MAD\ 8\cdot 9\cdot \overline{10}\cdot \overline{11}\cdot 12\cdot 13\cdot 14\cdot \overline{15}}$ + $\overline{OUT}$ | Out Port 10 |
| $\overline{MAD\ 8\cdot 9\cdot \overline{10}\cdot \overline{11}\cdot 12\cdot 13\cdot 14\cdot 15}$ + $\overline{IN}$ | In Port 11 |
| $\overline{MAD\ 8\cdot 9\cdot \overline{10}\cdot \overline{11}\cdot 12\cdot 13\cdot 14\cdot 15}$ + $\overline{OUT}$ | Out Port 11 |

The DBOUT4-7 signals are reflected through a CPU data bus buffer 110 to the input of the baud rate selection network. The DBOUT4 and 5 data bits are used to select the transmit baud rate. The DBOUT6 and 7 data bits are used to select the Receive baud rate. The baud rates provided by the baud rate selection network 106 in response to the DBOUT4-7 signals are indicated below in Table 8.

Table 8

| DBOUT4, 5/DBOUT6, 7 | Transmit Baud Rate /Receive Baud Rate |
|---|---|
| 00 | 110 |
| 01 | 2400 |
| 10 | 1200 |
| 11 | 9600 |

The 4 baud rate signals selected by baud rate selection network 106 are generated by a frequency divider circuit 112 in response to a 2 Mhz clock signal designated $\varphi 2$. The $\varphi 2$ clock signal is generated by one of two clocks used to synchronize the operation of the central processor unit as is well-known in the art. The DBOUT4-7 signals are latched in a 74175 quadruple flip-flop (not shown) in the baud rate selection network in response to the Out Port 11 signal from memory address decoder 108. The set and reset outputs of the latch and the outputs of the frequency divider circuit 112 are combined in a pair of AND-OR networks (not shown) within the baud rate selection network 106. The output of one AND-OR network provides the Receive Clock signal. The output of the other AND-OR network provides the Transmit Clock signal. Only the selected baud rate is gated through the appropriate AND-OR network.

The serial I/O communications interface circuit 20 receives data from and transmits data to both active and passive current loop devices. For example, the circuit can receive data from or transmit data to a passive device such as a Model 33ASR Teletype. In addition, the circuit can receive data from or transmit data to an active current loop device such as a main frame computer.

The use of current loops in data communication desired is well-known. Generally, the logic state of the current loop is determined by the presence or absence of a current of approximately 20 mA. The current loop itself is a low impedance transmission line which is highly resistant to noise. The current loop typically includes a voltage source in series with a 20 mA current regulator. The 20 mA current loop is described in greater detail in "The Bugbook IIA" published by E & L Instruments, Inc. of Derby, Conn.

Since the UART is a TTL device, the logic states of its inputs and outputs is determined by the presence or absence of "high" or "low" voltage signals. Accordingly, the current loop data received by the UART must be transformed to voltage signals at the UART input. Wave shaping network 114 receives current loop data and transforms it to voltage signals at the Serial In input of the UART. Active current loop devices such as a main frame computer generate data which is fed to an optical isolator 116 immediately prior to current-to-voltage conversion in the wave shaping network 114. The optical isolator isolates the UART voltage circuit from the current loop and is extremely effective in eliminating ground loop problems.

In transmitting data from the UART to a current loop, the voltage signals at the Serial Out output of the UART must be converted to current signals for use in the current loop. A Passive Current Loop device driver 118 converts the Serial Out voltage signals to current loop signals for operating the current loop device. In the case of an active current loop device, the output of the passive current loop device driver is passed through an optical isolator 120 connected to the passive current loop.

The serial I/O communications interface 20 includes a Paper Tape reader on/off latch 122 and driver circuit 124 for communicating with a paper tape reader such as the paper tape reader found in an ASR 33 or ASR 35 Teletype. Paper tape reader data is received by the UART through an active current loop. The tape reader is turned on and off in accordance with the program stored in memory 14. Thus, the DBOUT1 data bit generated by the central processor unit is reflected through the CPU data bus buffer 110 to the paper tape reader on/off latch 122. The state of the DBOUT1 data bit determines the on/off condition of latch 122 in conjunction with an Out Port 11 signal generated by the memory address decoder 108. The paper tape reader activator coil is operated directly by the paper tape reader driver circuit 124 in response to the output of the on/off latch 122.

Data provided at the output data bus of the central processor unit is transmitted by the UART to a current loop in response to an Out Port 10 signal generated by the memory address decoder 108. The central processor unit output data DBO-7 is reflected through CPU data bus buffer 110 to the input of the UART. The UART receives the output data and appends the appropriate data format bits selected by the data format selection circuit 104 and serially transmits the data at the selected baud rate on the Serial Out line.

Data received from a current loop via the Serial In input to the UART is transmitted to the input data bus DBIN0-7 of the central processor unit in response to an In Port 10 signal generated by the memory address decoder 108. The UART strips the received data of all data format bits and transmits the received data in parallel to the central processor unit input data bus.

The status of the UART may be periodically examined by the central processor unit. The transmit and receiver buffer and control status of the UART is transmitted by the UART to the central processor unit input data bus DBIN0-7 in response to an In Port 11 signal generated by the memory address decoder 108. This status information can be used by the central processor unit to determine whether data from an external device has been received, whether a data transmission operation has been completed and whether data contained any format error.

Lamp And Display Interface

The lamp and display interface and driver 32 controls the lamps and display circuit 33. See FIG. 1. The lamps and display circuit 33 includes a plurality of lamps which indicate that certain of the switches on switch panel 30 have been operated. For example, the lamps include the "Error" lamp, the "Re-Key" lamp and the "Multiple Documents" lamp. The operation of each of these lamps in connection with the central processor unit has already been described. The lamps and display circuit 33 also includes four parallel connected numeric displays such as a Burroughs S Panaplex BR 13251 numeric display. These displays indicate the remittance document amount and the three transaction document amounts selectable from the three transaction document fields in connection with the "Field 1, 2 and 3" switches on switch panel 30.

The information used to energize the lamps and the data which is ultimately displayed on the numeric displays is generated by the central processor unit on its output data bus DBOUT0-7. See FIG. 6A. The lamps and displays are operated in synchronism with the central processor unit by means of the central processor unit MAD8-15 memory address signals and the OUT signal. The memory address decoder generates the Out Port 20, 21, 22 and 23 signals in response to the memory address and OUT signals. The decoding function of the memory address decoder is indicated in Table 9 below.

Table 9

| Function | Port Signal |
| --- | --- |
| MAD $\overline{8}\cdot9\cdot\overline{10}\cdot\overline{11}\cdot\overline{12}\cdot13\cdot\overline{14}\cdot\overline{15}$ + $\overline{OUT}$ | Out Port 20 |
| MAD $8\cdot9\cdot\overline{10}\cdot\overline{11}\cdot\overline{12}\cdot13\cdot\overline{14}\cdot\overline{15}$ + $\overline{OUT}$ | Out Port 21 |
| MAD $\overline{8}\cdot9\cdot\overline{10}\cdot\overline{11}\cdot\overline{12}\cdot13\cdot\overline{14}\cdot15$ + $\overline{OUT}$ | Out Port 22 |
| MAD $8\cdot9\cdot\overline{10}\cdot\overline{11}\cdot\overline{12}\cdot13\cdot\overline{14}\cdot15$ + $\overline{OUT}$ | Out Port 23 |

The DBOUT0-7 signals are reflected through a CPU data bus buffer 128 to a lamp driver latch circuit 130. Lamp driver latch circuit 130 comprises four 74175 quadruple D-type flip-flops. Bits DBOUT0-3 are transmitted to a first pair of the flips and bits DBOUT 4-7 are transmitted to a second pair of the flip-flops. One flip-flop in each pair is clocked by the Out Port 22 signal from the memory address decoder. The other flip-flop in each pair is clocked by the Out Port 23 signal from the memory address decoder. The lamp driver latch circuit is provided with two sets of eight-wide outputs. A first set of outputs, denoted lamps 1-7 and audible alarm, is generated by the lamp driver latch circuit in response to the DBOUT0-7 signals when the memory address decoder 126 generates an Out Port 22 signal. The other set of outputs, denoted lamps 9-16, are generated by the lamp driver latch circuit in response to the DBOUT0-7 signals when the memory address decoder generates an Out Port 23 signal.

The DBOUT0-3 signals transmitted through the CPU data bus buffer 128 contain the information ultimately displayed on the numeric displays. The DBOUT5-7 signals are transmitted through the CPU data bus buffer to a display memory address counter gating logic circuit 132. The gating logic circuit 132 generates control signals CNTRT, CNTP and MEMWT which control the display memories as described hereinafter. These signals are generated by the gating logic circuit 132 when the memory address decoder 126 generates an Out Port 21 signal. The gating logic function of circuit 132 is indicated in Table 10 below.

Table 10

| Gating Logic 132 Functions | | |
|---|---|---|
| CNTRT | CNTP | MEMWT |
| DBOUT5.Out Port 21 | DBOUT6.Out Port 21 | DBOUT7.Out Port 21 |

The display memories (see FIG. 6B) are scanned in response to a OSON signal generated by an oscillator on/off flip-flop 134. See FIG. 6A. Flip-flop 134 may be a 7474 D-type flip-flop having its data input connected to the DBOUT 7 line and its clock input connected to the Out Port 20 line. The DBOUT7 signal transmitted through the CPU data bus buffer 128 is clocked onto the OSON output line of flip-flop 134 by the Out Port 20 signal generated by memory address decoder 126. The OSON output of the flip-flop is periodically reset by a Reset signal generated by the central processor unit in accordance with the program stored in memory 14. The Reset signal is transmitted through a buffer 136 for use in resetting the memory enable latch 168 (see FIG. 6B) associated with the display memories.

The driver portion of circuit 32 drives the cathodes and anodes of the four Burroughs Panaplex numeric displays in lamps and display circuit 33. Each Panaplex unit has the capacity to display 10 individual seven-segment digits.

The four numeric displays are scanned sequentially at a rate of approximately 600 Hz. The scan clock rate is generated by an oscillator 138. See FIG. 6B. The oscillator is turned on and off by the OSON signal generated by the oscillator on/off flip-flop 134. The oscillator output is logically NORed with the CNTP signal generated by the display memory address counter gating logic circuit 132. The resultant signal is used to clock a memory address counter 140 which is a 7490 decade counter connected to count in BCD. The outputs of the counter are fed to a one of ten decoder 142 such as 7442 BCD to decimal decoder. The outputs of decoder 142 are grouped in sets of five lines which are separately fed to voltage level shifter circuits 144 and 146. The voltage level shifter circuits 144 and 146 separately control display anode drivers 148 and 150. The anode drivers 148 and 150 drive the anode buses of the four numeric displays.

When the oscillator 138 is driven on by the OSON signal, the outputs of the one of ten decoder 142 are continually scanned. Only one of the outputs of the decoder is driven "low" at any given time. The voltage level shifters 144 and 146 provide high voltage output signals to the anode drivers 148 and 150 in response to the decoder outputs. The anode drivers 148 and 150 scan the anode buses at a rate of 600 Hz in response to the oscillator 138, decoder 142 and voltage level shifters 144 and 146.

The cathodes of displays 1-4 are driven by display cathode drivers 152, 154, 156 and 158, respectively. Display drivers 152, 154, 156 and 158 are DM8884 BCD to seven segment decoder/drivers. The display drivers are controlled by the outputs of 16 ×4 memories 160, 162, 164 and 166. Each 16 × 4 memory may be a 7489 64-bit read/write memory. When a digit is to be displayed, it appears on the outputs of one of the 16 × 4 memories and is transformed into a seven-segment pattern by the associated decoder/driver. This pattern is placed on the segment lines of the numeric display. When an anode or digit line is activated for that display, the selected BCD digit is made visible.

The memory address counter 140 is clocked by the CNTP signal which is gated into the memory address counter by the oscillator 138 output. The memory address counter is periodically reset by the CNTRT signal. The outputs of the memory address counter are transmitted to the address inputs of the 16 × 4 memories 160, 162, 164 and 166. The signals determine the address location of each memory into which data is to be written or out of which data is to be read.

The DBOUT0-3 signals generated by the central processor unit are transmitted to the data input terminals of each 16 × 4 memory. This data is written into a memory at the address location indicated by the memory address counter 140 outputs in response to the MEMWT signal and the appropriate output of a memory enable latch circuit 168. Each of the outputs of memory enable latch circuit 168 enables a reading or writing operation in connection with one of the 16 × 4 memories. The DBOUT0-3 output signals from the central processor unit are strobed into the memory enable latch outputs by the Out Port 20 signal generated by memory address decoder 126. See FIG. 6A. The memory enable latch is periodically cleared by the Reset signal transmitted from the central processor unit through buffer 136. See FIG. 6A. Each of the 16 × 4 memories is accessed by memory address counter 140 in synchronism with the scanning operation performed by the anode drivers 148 and 150. See FIG. 6B.

The sequence in which data is written into the 16 × 4 memories and read out of the memories onto the numeric displays 1–4 is determined by an algorithm executed by the central processor unit in accordance with the program stored in memory 14. To initiate the algorithm, the OSON signal turns off the oscillator 138. The CNTRT signal then resets the memory address counter 140. The memory address counter therefore addresses the first address location in the 16 × 4 memories. The memory enable latch circuit 168 selects one of the 16 × 4 memories into which digit 1 represented by the DBOUT0-3 signals is to be written. The DBOUT0-3 data is then written into the first address location in response to the MEMWT signal. The memory address counter is then advanced to the second address location, corresponding to the digit 2 data, by the CNTP signal. The DBOUT0-3 data representative of digit 2 is then written into the second address location in response to the MEMWT signal. The foregoing steps are repeated until the digit 10 bit data is written into the selected memory.

To read data out of a memory, the memory enable latch 168 selects the 16 × 4 memory associated with the numeric display to be activated. The oscillator 138 is turned on by the OSON signal, and the CNTP signal clocks the memory address counter 140. Accordingly, the information in each address location of the selected 16 × 4 memory is read out of the memory to the associated display driver circuit and is displayed on the associated numeric display.

Interface circuits 16, 18, 20, 22 and 32 are operated by the central processor unit 12 in synchronism with the execution of instructions of the program stored in memory 14. The transfer of data between the card reader 28, switch panel 30, and active and passive current loops and the central processor unit 12 is controlled by the interface circuits in response to the central processor unit signals IN, OUT, DBOUT0-7 and MAD8-15. The encoder 24 is operated by the central processor unit 12 by means of the encoder interface 18 in accordance with the program stored in memory 14 and the data transmitted to the central processor unit by the card reader, switch panel and active or passive current loops. The operation of the encoder in the "Key" and "Compare" modes is therefore a function of hardware, in the form of the interface circuits, and software, in the form of the program stored in memory 14. A program for effecting the "Key" and "Compare" modes of operation of the encoder in response to the central processor unit 12 has been written in macro assembler language. A copy of the program is appended to this application. It is a relatively simple task to hardwire the interface circuitry as described herein to the central processor unit and encoder and to operate the same in accordance with the appended program.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for processing remittance and transaction documents by operating an encoder having a keyboard for generating a plurality of keyboard signals in accordance with a program, comprising:
   means for reading information stored on a transaction document and for generating a first set of digital signals representative thereof;
   a memory for storing a program of processing remittance and transaction documents;
   a central processor unit operatively associated with said memory for sequentially generating a plurality of groups of data signals in accordance with a program stored in said memory;
   means operatively associated with said central processor unit and said reading means for transmitting said first set of digital signals representative of said transaction document information to said central processor unit in response to one of said groups of central processor unit data signals;
   means for displaying numeric information stored on a transaction document;
   means operatively associated with said display means and said central processor unit for causing said display means to display said numeric information in response to another of said groups of central processor unit data signals;
   means operatively associated with said central processor unit for sensing the states of a plurality of switches and for generating a second set of digital signals representative of endorsement information as a function thereof;
   means operatively associated with said central processor unit and said switch sensing means for transmitting said second set of digital signals representative of endorsement information to said central processor unit in response to another group of said central processor unit data signals; and
   means operatively associated with an encoder and said central processor unit for causing for encoder to encode a remittance document with the transaction document information and to endorse the transaction document with the endorsement information in response to another group of said central processor unit data signals.

2. Apparatus according to claim 1 wherein said means for causing the encoder to encode and endorse the remittance document includes means for sensing a plurality of signals generated by an encoder keyboard and means for generating a third set of digital signals representative of remittance document information as a function thereof and means operatively associated with said keyboard sensing means for transmitting said third set of digital signals representative of remittance document information to said central processor unit in response to another groups of said central processor unit data signals, and said central processor unit includes means for comparing said third set of digital signals representative of remittance document information to said first set of digital signals representative of transaction document information and for inhibiting said means for causing the encoder to encode and endorse the remittance document from encoding and endorsing the remittance document if said third and first sets of digital signals do not match.

3. Apparatus according to claim 2 wherein said reading means includes means for reading a multiple transaction code stored on a preselected transaction document, said multiple transaction code indicating that a group of associated transaction documents corresponds to a single remittance document, and for generating a digital signal represenative thereof, wherein said means for transmitting said first set of digital signals to said central processor unit includes means for transmitting said digital signal representative of the multiple transaction code to said central processor unit, wherein said central processor unit includes means for accumulating the transaction document information for the group of transaction documents in response to said digital signal representative of said multiple transaction code, and wherein said means for causing the encoder to encode and endorse includes means for causing the encoder to encode a remittance document with the accumulated transaction document information.

4. Apparatus according to claim 2 wherein said means for sensing the states of a plurality of switches includes means for sensing the state of a multiple check switch and for generating a multiple check digital signal as a function thereof, said multiple check digital signal indicating that a group of remittance documents corresponds to a single transaction document, wherein said central processor unit includes means for accumulating the remittance document amount information for a group of remittance documents in response to said multiple check digital signal and for generating a multiple check accumulation signal as a function thereof, and wherein said means for causing the encoder to encode and endorse includes means for causing the encoder to print out the sum of the remittance information of the group of remittance documents in response to said multiple check accumulation signal.

5. Apparatus according to claim 2 including a universal asynchronous receiver transmitter operatively associated with said central processor unit and at least one current loop, comprising means for receiving digital information from said central processor unit, means for serially transmitting said central processor unit digital information to a current loop at a plurality of baud rates selectable by said central processor unit, means for serially receiving digital information from a current loop at a plurality of baud rates selectable by said central processor unit, and means for transmitting said current loop digital information to said central processor unit.

6. Apparatus according to claim 2 wherein said means for sensing a plurality of signals generated by an encoder keyboard includes means for detecting a key-in error in the signals generated by the encoder keyboard and for generating an error signal indicative thereof.

7. Apparatus for processing remittance and transaction documents in accordance with a program and the operation of an encoder having a keyboard for generating a plurality of keyboard signals, comprising:
means for reading information stored on a transaction document and for generating a first set of digital signals representative thereof;
a memory for storing a program of processing remittance and transaction documents;
a central processor unit operatively associated with said memory for sequentially generating a plurality of groups of data signals in accordance with a program stored in said memory;
means operatively associated with said central processor unit and reading means for transmitting said first set of digital signals representative of said transaction document information to said central processor unit in response to one of said groups of central processor unit data signals;
means operatively associated with said central processor unit for sensing the states of a plurality of switches and for generating a second set of digital signals representative of endorsement information as a function thereof;
means operatively associated with said central processor unit and switch sensing means for transmitting said second set of digital signals representative of endorsement information to said central processor unit in response to another group of said central processor unit data signals;
means operatively associated with an encoder and said central processor unit for causing the encoder to encode a remittance document with the transaction document information and to endorse the remittance document with the endorsement information in response to another group of said central processor unit data signals;
said means for causing the encoder to encode and endorse the remittance document including means for sensing a plurality of signals generated by an encoder keyboard and for generating a third set of digital signals representative of remittance document information as a function thereof and means operatively associated with said keyboard sensing means for transmitting said third set of digital signals representative of remittance document information to said central processor unit in response to another group of said central processor unit data signals; and
said central processor unit including means for comparing said third set of digital signals representative of remittance document information to said first set of digital signals representative of transaction document information and for inhibiting said means for causing the encoder to encode and endorse the remittance document from encoding and endorsing the remittance document if said third and first sets of digital signals do not match.

8. Apparatus according to claim 7 including a universal asynchronous receiver transmitter operatively associated with said central processor unit and at least one current loop, comprising means for receiving digital information from said central processor unit, means for serially transmitting said central processor unit digital information to a current loop at a plurality of baud rates selectable by said central processor unit, means for serially receiving digital information from a current loop at a plurality of baud rates selectable by said central processor unit, and means for transmitting said current loop digital information to said central processor unit.

9. A method of processing remittance and transaction documents by operating an encoder having a keyboard for generating a plurality of keyboard signals in accordance with a program, comprising:
reading information stored on a transaction document and generating a first set of digital signals representative thereof;
storing a program of processing remittance and transaction documents in a memory;
sequentially generating a plurality of groups of data signals in accordance with a stored program;
transmitting said first set of digital signals representative of said transaction document information to said central processor unit in response to one of said groups of central processor unit data signals;
sensing the states of a plurality of switches and generating a second set of digital signals representative of endorsement information as a function thereof;
transmitting said second set of digital signals representative of endorsement information to said central processor unit in response to another group of said central processor unit data signals;
causing the encoder to encode a remittance document with the transaction document information and to endorse the remittance document with the endorsement information in response to another group of said central processor unit data signals; and
displaying numeric information stored on a transaction document as a function of sid step of transmitting said first set of digital signals and in response to another of said groups of central processor unit data signals.

10. The method according to claim 9 wherein said step of causing the encoder to encode and endorse the remittance document includes sensing a plurality of signals generated by an encoder keyboard and generating a third set of digital signals representative of the remittance document information as a function thereof, transmitting said third set of digital signals representative of remittance document information to said central processor unit in response to another group of said central processor unit data signals, and comparing said third set of digital signals representative of remittance document information to said first set of digital signals representative of transaction document information and inhibiting the encoder from encoding and endorsing the remittance document if said third and first sets of digital signals do not match.

11. The method according to claim 9 including reading a multiple transaction code stored on a preselected transaction document, said multiple transaction code indicating that a group of associated transaction documents corresponds to a single remittance document, and generating a digital signal representative thereof, transmitting said digital signal representative of said multiple transaction code to said central processor unit, accumulating the transaction document information for the group of transaction documents in response to said digital signal representative of said multiple transaction code, and causing the encoder to encode a remittance document with the accumulated transaction document information.

12. The method according to claim 9 including sensing the state of a multiple check switch and generating a multiple check digital signal as a function thereof, said multiple check digital signal indicating that a group of remittance documents corresponds to a single transaction document, accumulating the remittance document information for a group of remittance documents in response to said multiple check digital signal and generating a multiple check accumulation signal as a function thereof, and causing the encoder to print out the sum of the remittance information of the group of remittance documents in response to said multiple check accumulation signal.

13. The method according to claim 9 including receiving digital information from said central processor unit, serially transmitting said central processor unit digital information to a current loop at a plurality of baud rates selectable by said central processor unit, serially receiving digital information from a current loop at a plurality of baud rates selectable by said central processor unit, and transmitting said current loop digital information to said central processor unit.

* * * * *